(12) United States Patent
Luo et al.

(10) Patent No.: US 11,438,941 B2
(45) Date of Patent: Sep. 6, 2022

(54) COMMUNICATION METHOD AND COMMUNICATIONS APPARATUS

(71) Applicant: HUAWEI TECHNOLOGIES CO., LTD., Guangdong (CN)

(72) Inventors: Haiyan Luo, Shanghai (CN); Mingzeng Dai, Shenzhen (CN); Wenjie Peng, Shanghai (CN); Yizhen Wu, Shanghai (CN); Jun Wang, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 2 days.

(21) Appl. No.: 17/098,841

(22) Filed: Nov. 16, 2020

(65) Prior Publication Data

US 2021/0068176 A1     Mar. 4, 2021

Related U.S. Application Data

(63) Continuation of application No. PCT/CN2019/087099, filed on May 15, 2019.

(30) Foreign Application Priority Data

May 17, 2018    (CN) .......................... 201810476295.8

(51) Int. Cl.
*H04W 76/11*       (2018.01)
*H04W 76/15*       (2018.01)
(Continued)

(52) U.S. Cl.
CPC ............. *H04W 76/11* (2018.02); *H04L 43/16* (2013.01); *H04L 69/32* (2013.01); *H04W 4/40* (2018.02); *H04W 76/15* (2018.02)

(58) Field of Classification Search
CPC ....... H04W 76/11; H04W 4/40; H04W 76/15; H04W 40/34; H04L 43/16; H04L 69/32;
(Continued)

(56) References Cited

U.S. PATENT DOCUMENTS

2016/0219509 A1    7/2016   Fujishiro et al.
2017/0245245 A1    8/2017   Kim et al.
2020/0178048 A1    6/2020   Kim et al.

FOREIGN PATENT DOCUMENTS

CN        105611642 A     5/2016
CN        105682149 A     6/2016
(Continued)

OTHER PUBLICATIONS

Ericsson, "Packet duplication for PC5," 3GPP TSG-RAN WG2 #99, R2-1709371, Berlin, Germany, Aug. 21-25, 2017, 3 pages.
Extended European Search Report issued in European Application No. 19802858.1 dated Jun. 15, 2021, 10 pages.
Office Action issued in Chinese Application No. 201810476295.8 dated Dec. 3, 2020, 13 pages.
(Continued)

*Primary Examiner* — Walter J Divito
(74) *Attorney, Agent, or Firm* — Fish & Richardson P.C.

(57) ABSTRACT

An example communication method includes that a first terminal device receives through a first path a first data packet from a second terminal device. The first terminal device receives through a second path a second data packet from a second terminal device, where the first path has a mapping relationship with the second path. The first terminal device transmits, based on the mapping relationship, the first data packet and the second data packet to a same aggregation protocol layer entity to perform data aggregation processing.

20 Claims, 17 Drawing Sheets

(51) Int. Cl.
*H04W 4/40* (2018.01)
*H04L 43/16* (2022.01)
*H04L 69/32* (2022.01)

(58) Field of Classification Search
CPC ..... H04L 29/06; H04L 29/08; H04L 49/9057; H04L 69/26; H04L 69/30
See application file for complete search history.

(56) References Cited

FOREIGN PATENT DOCUMENTS

| | | |
|---|---|---|
| CN | 107040959 A | 8/2017 |
| CN | 107241786 A | 10/2017 |
| CN | 110166978 A | 8/2019 |
| WO | 2015029980 A1 | 3/2015 |
| WO | 2018066876 A1 | 4/2018 |

OTHER PUBLICATIONS

3GPP TS 33.185 V14.1.0.(Sep. 2017), "3rd Generation Partnership Project; Technical Specification Group Services and System Aspects; Security aspect for LTE support of Vehicle-to-Everything (V2X) services (Release 14)," Sep. 2017, 10 pages.

CATT, "Discussion of PC5 ad Uu Path Configuration," 3GPP TSG-RAN WG2 Meeting #97, R2-1701236, Athens, Greece, Feb. 13-17, 2017, 2 pages.

Intel Corporation, "Discussion on synchronous and asynchronous scenarios in V2X CA," 3GPP TSG-RAN WG4 Meeting #85, R4-1712346, Reno, Nevada, USA Nov. 27-Dec. 1, 2017, 3 pages.

PCT International Search Report and Written Opinion issued in International Application No. PCT/CN2019/087099 dated Jun. 28, 2019, 20 pages (with English translation).

ZTE, "Discussion on the V2V path selection between Uu and PC5," 3GPP TSG-RAN WG2 Meeting #93bis, R2-162401, Dubrovnik, Croatia, Apr. 11-15, 2016, 3 pages.

Office Action issued in Indian Application No. 202047053401 dated Dec. 17, 2021, 6 pages.

COMMUNICATION METHOD AND COMMUNICATIONS APPARATUS

CROSS-REFERENCE TO RELATED APPLICATIONS

This application is a continuation of International Application No. PCT/CN2019/087099, filed on May 15, 2019, which claims priority to Chinese Patent Application No. 201810476295.8, filed on May 17, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In a communications system, to further improve user experience, a higher requirement is imposed on performance of transmitting data packets. For example, in an internet of vehicles that supports V2X (Vehicle to Everything) communication, improving performance of transmitting of data packets is particularly important.

In another communications system such as an internet of vehicles, data packets can be transmitted between two terminal devices through a direct wireless interface without participation of a network device. To improve performance of transmitting the data packets, the data packets may be duplicated or split between the two terminal devices, and then transmitted through a plurality of interfaces. How a receive end learns that the data packets received through the plurality of interfaces need to be aggregated, namely, a manner in which the data packets from the plurality of interfaces are reordered or deduplicated, is to be studied.

SUMMARY

This application provides a communication method and a communications apparatus, so that a receive end can learn of interfaces, where data packets received through paths of the interfaces need to be aggregated.

According to a first aspect, an embodiment of this application provides a communication method, including: receiving, by a first terminal device through a first path, a first data packet sent by a second terminal device, where the first path is borne on a first wireless interface, and the first wireless interface is a wireless communications interface for direct communication between the second terminal device and the first terminal device; receiving, by the first terminal device through a second path, a second data packet sent by the second terminal device, where the second path is borne on a second wireless interface, and the second wireless interface is a communications interface for communication between a wireless network device and the first terminal device, or the second wireless interface is another wireless communications interface for direct communication between the second terminal device and the first terminal device, where the first path has a mapping relationship with the second path; and transmitting, by the first terminal device based on the mapping relationship, the first data packet and the second data packet to a same aggregation protocol layer entity, to perform data aggregation processing.

In this embodiment of this application, the first terminal device learns that the first path has the mapping relationship with the second path, and the mapping relationship indicates that the data packet received through the first path and the data packet received through the second path need to be aggregated in the same aggregation protocol layer entity, so that the first terminal device can determine that the data packet received through the first path and the data packet received through the second path need to be aggregated in the same aggregation protocol layer entity, and then perform the data aggregation processing. In this embodiment of this application, although the data packets are separately transmitted through two different paths, the data packets are finally aggregated in the same aggregation protocol layer entity of the first terminal device.

In a possible design, that the first path has a mapping relationship with the second path is determined in the following manner:

if the second data packet received through the second path carries identification information of the first path, determining that the first path has the mapping relationship with the second path.

In the foregoing design, the second path carries the identification information of the first path, so that the first terminal device learns that the mapping relationship exists between the two paths, and then can perform the data aggregation processing on the data packets received through the two paths.

In a possible design, a first adaptation layer is configured for the second path of the first terminal device, and the first adaptation layer is located above a packet data convergence protocol PDCP layer of the second path, or the first adaptation layer is located between a packet data convergence protocol PDCP layer of the second path and a radio link control protocol RLC layer of the second path; and the first adaptation layer of the second data packet carries the identification information of the first path.

In the foregoing design, an existing protocol stack architecture is modified without changing functions of other protocol layers. The adaptation layer is added to the second path. The second terminal device, serving as a transmit end, indicates the identification information of the first path to the first terminal device through the adaptation layer of the second path, so that the first terminal device learns that the mapping relationship exists between the two paths, and then can perform the data aggregation processing on the data packets received through the two paths.

In a possible design, the identification information of the first path is a logical channel identifier of the first path.

In a possible design, the method further includes: obtaining, by the first terminal device, first indication information, where the first indication information is used to indicate that the first adaptation layer is configured for the second path of the first terminal device.

In the foregoing design, the first terminal device may obtain the first indication information by receiving the first indication information sent by the wireless network device, or may obtain the first indication information based on the first indication information carried in the second data packet.

In a possible design, the first adaptation layer is located above the PDCP layer of the second path, the first path and the second path share a first aggregation layer, the first aggregation layer is located above the first adaptation layer, an aggregation protocol layer is the first aggregation layer, and a first aggregation layer entity corresponding to the first aggregation layer is the aggregation protocol layer entity; or the first adaptation layer is located between the PDCP layer of the second path and the RLC layer of the second path, the first path and the second path share the same PDCP layer, the same PDCP layer is a first aggregation layer, and a PDCP layer entity corresponding to the same PDCP layer is the aggregation protocol layer entity.

In the foregoing design, two protocol stack architectures are provided, and a protocol layer at which the first terminal device aggregates data is described.

In a possible design, the first terminal device may alternatively determine, in the following manner, that the first path has the mapping relationship with the second path. For example, the first terminal device receives configuration information sent by the wireless network device, where the configuration information is used to indicate that the first path has the mapping relationship with the second path.

In a possible design, the configuration information may include a correspondence between identification information of the first path and identification information of the second path, where the identification information of the first path is a logical channel identifier of the first path; and the identification information of the second path includes a logical channel identifier of the second path and/or a radio bearer identifier of the second path.

In a possible design, the first terminal device may alternatively determine, in the following manner, that the first path has the mapping relationship with the second path: if the first data packet received through the first path carries identification information of the second path, determining that the first path has the mapping relationship with the second path.

In the foregoing design, the first path carries the identification information of the second path, so that the first terminal device learns that the mapping relationship exists between the two paths, and then can perform the data aggregation processing on the data packets received through the two paths.

In a possible design, a second adaptation layer is configured for the first path of the first terminal device, and the second adaptation layer is located above a packet data convergence protocol PDCP layer of the first path, or the second adaptation layer is located between a PDCP layer of the first path and an RLC layer of the first path; and the second adaptation layer of the first data packet carries the identification information of the second path.

In the foregoing design, an existing protocol stack architecture is modified without changing functions of other protocol layers. The adaptation layer is added to the first path. The second terminal device, serving as a transmit end, indicates the identification information of the second path to the first terminal device through the adaptation layer of the first path, so that the first terminal device learns that the mapping relationship exists between the two paths, and then can perform the data aggregation processing on the data packets received through the two paths.

In a possible design, the identification information of the second path includes a logical channel identifier of the second path and/or a radio bearer identifier of the second path.

In a possible design, the method further includes: obtaining, by the first terminal device, second indication information, where the second indication information is used to indicate that the second adaptation layer is configured for the first path of the first terminal device.

For example, the first terminal device may obtain the second indication information in the following manner:

The first terminal device receives the second indication information sent by the wireless network device, where the second indication information is used to indicate that the second adaptation layer is configured for the first wireless interface of the first terminal device. Alternatively, the first data packet carries the second indication information, and the second indication information is used to indicate that the second adaptation layer is configured for the first wireless interface of the first terminal device, so that the second indication information is obtained from the first data packet.

In a possible design, if the second adaptation layer is located above the packet data convergence protocol PDCP layer of the first wireless interface, the first wireless interface and the second wireless interface share a second aggregation layer, and the second aggregation layer is located above the second adaptation layer, where an aggregation protocol layer is the second aggregation layer, and a second aggregation layer entity corresponding to the second aggregation layer is the aggregation protocol layer entity; or the second adaptation layer is located between the PDCP layer of the first wireless interface and the RLC layer of the first wireless interface, and the first wireless interface and the second wireless interface share the same PDCP layer, where an aggregation protocol layer is the same PDCP layer, and a PDCP layer entity corresponding to the same PDCP layer is the aggregation protocol layer entity.

In a possible design, if the PDCP layer of the first data packet includes a first aggregation identifier, the first aggregation identifier is used to indicate a data bearer to which the first data packet belongs, the PDCP layer of the second data packet includes a second aggregation identifier, and the second aggregation identifier is used to indicate a data bearer to which the second data packet belongs, the first terminal device determines, in the following manner, that the first path has the mapping relationship with the second path: The first terminal device determines that the first aggregation identifier is the same as the second aggregation identifier.

In a possible design, if the first wireless interface and second wireless interface of the first terminal device share a same third aggregation layer, the third aggregation layer is located above the PDCP layer of the first terminal device, the third aggregation layer of the first data packet includes a third aggregation identifier, the third aggregation identifier is used to indicate a data bearer to which the first data packet belongs, the third aggregation layer of the second data packet includes a fourth aggregation identifier, and the fourth aggregation identifier is used to indicate a data bearer to which the second data packet belongs, the first terminal device determines, in the following manner, that the first path has the mapping relationship with the second path: The first terminal device determines that the third aggregation identifier is the same as the fourth aggregation identifier.

In a possible design, if the second wireless interface is a communications interface for direct communication between the second terminal device and the first terminal device, a third adaptation layer is configured for the first wireless interface of the first terminal device, a fourth adaptation layer is configured for the second wireless interface of the first terminal device, the fourth adaptation layer is located above the PDCP layer of the second wireless interface, the first wireless interface and the second wireless interface share a fourth aggregation layer, and the fourth aggregation layer is located above the third adaptation layer and the fourth adaptation layer; the third adaptation layer of the first data packet includes a fifth aggregation identifier, and the fifth aggregation identifier is used to indicate to perform data aggregation at the fourth aggregation layer for the first data packet; and the fourth adaptation layer of the second data packet includes a sixth aggregation identifier, and the sixth aggregation layer identifier is used to indicate to perform data aggregation at the fourth aggregation layer for the second data packet. Therefore, the first terminal device determines that the fifth aggregation identifier of the third adaptation layer and the sixth aggregation identifier of the fourth adaptation layer indicate the same fourth aggregation layer, and then determines that aggregation processing needs to be performed on the first data packet and the second data packet. In other words, when both the first data packet and the second data packet are transmitted to the fourth aggregation layer, the first terminal device performs the data aggregation processing on the first data packet and the second data packet at the fourth aggregation layer.

In a possible design, the first data packet carries third indication information, and the third indication information is used to indicate that the third adaptation layer is configured for the first wireless interface; the second data packet carries fourth indication information, and the fourth indication information is used to indicate that the fourth adaptation layer is configured for the second wireless interface.

In a possible design, if the second wireless interface is a communications interface for direct communication between the second terminal device and the first terminal device, a fifth adaptation layer is configured for the first wireless interface of the first terminal device, the fifth adaptation layer is located between the PDCP layer of the first wireless interface and the RLC layer of the first wireless interface, a sixth adaptation layer is configured for the second wireless interface of the first terminal device, the sixth adaptation layer is located between the PDCP layer of the second wireless interface and the RLC layer of the second wireless interface, and the first wireless interface and the second wireless interface share a same PDCP layer; the fifth adaptation layer of the first data packet includes a seventh aggregation identifier, and the seventh aggregation identifier is used to indicate to perform data aggregation at the same PDCP layer for the first data packet; and the sixth adaptation layer of the second data packet includes an eighth aggregation identifier, and the eighth aggregation layer identifier is used to indicate to perform data aggregation at the same PDCP layer for the second data packet. In other words, when both the first data packet and the second data packet are transmitted to the same PDCP layer, the first terminal device performs the data aggregation processing on the first data packet and the second data packet at the same PDCP layer.

In a possible design, the first data packet carries fifth indication information, and the fifth indication information is used to indicate that the fifth adaptation layer is configured for the first wireless interface of the first terminal device; the second data packet carries sixth indication information, and the sixth indication information is used to indicate that the sixth adaptation layer is configured for the second wireless interface of the first terminal device.

In a possible design, the first wireless interface and the second wireless interface are communications interfaces for direct communication between the second terminal device and the first terminal device in different standards; that the first path has a mapping relationship with the second path is determined in the following manner: determining, according to a pre-configured mapping rule, that the first path has the mapping relationship with the second path.

According to a second aspect, an embodiment of this application provides a communication method, including: sending, by a second terminal device, a first data packet to the first terminal device through a first path; and sending, by the second terminal device, a second data packet to the first terminal device through a third path, where the second data packet carries identification information of the first path, where the first path is borne on a first wireless interface, and the first wireless interface is a wireless communications interface for direct communication between the second terminal device and the first terminal device; the third path is borne on a third wireless interface, and the third wireless interface is a wireless communications interface for communication between the wireless network device and the second terminal device, or the third wireless interface is another wireless communications interface for direct communication between the first terminal device and the second terminal device; and the first terminal device performs aggregation processing on the first data packet and the second data packet.

In this embodiment of this application, the second data packet sent by the second terminal device to the first terminal device through the third path carries the identification information of the first path, so that the first terminal device determines that the data aggregation processing needs to be performed on the first data packet and the second data.

In a possible design, the identification information of the first path is a logical channel identifier of the first path.

In a possible design, an adaptation layer is configured for the third path of the second terminal device; the adaptation layer is located above a PDCP layer of the second path, or the adaptation layer is located between a PDCP layer of the second path and an RLC layer of the second path; and the adaptation layer of the first data packet carries the identification information of the first path.

In a possible design, the method further includes: receiving, by the second terminal device, a dual connectivity indication sent by the wireless network device, where the dual connectivity indication is used to indicate the second terminal device to send, to the first terminal device through the two paths, the data packets needing to be aggregated.

In the foregoing design, the wireless network device may indicate the second terminal device to enable the dual connectivity indication, so that the second terminal device starts to send, to the first terminal device through the two paths (the first path and the third path), the data packets needing to be aggregated.

In a possible design, the method further includes: receiving, by the second terminal device, a rule for enabling dual connectivity sent by the wireless network device; and when determining that the rule for enabling dual connectivity is satisfied, enabling, by the second terminal device, sending of the data packets needing to be aggregated to the first terminal device through the first path and the third path, where the rule for enabling dual connectivity includes any one or more of the following:

a ProSe per packet priority PPPP corresponding to a data packet currently transmitted by the second terminal device is less than a first threshold;

a ProSe per packet reliability PPPR corresponding to a data packet currently transmitted by the second terminal device is less than a second threshold;

a channel busy ratio CBR of an interface that is currently used by the second terminal device is greater than a third threshold;

a channel busy ratio CBR of an interface that is not currently used by the second terminal device is less than a fourth threshold;

a signal strength of an interface that is currently used by the second terminal device is less than a fifth threshold;

a signal strength of an interface that is not currently used by the second terminal device is greater than a sixth threshold; or a quantity of to-be-transmitted data packets that are of the second terminal device or on one path of the second terminal device is greater than a seventh threshold.

In the foregoing design, the wireless network device configures the rule for enabling dual connectivity for the second terminal device, so that the second terminal device determines when to enable dual connectivity according to the rule for enabling dual connectivity.

According to a third aspect, an embodiment of this application provides a communication method, including: receiving, by the second terminal device, configuration information sent by a wireless network device, where the configuration information is used to indicate that a first path has a mapping relationship with a third path, where the first path is borne on a first wireless interface, and the first wireless interface is a wireless communications interface for direct communication between the second terminal device and the first terminal device; the third path is borne on a third wireless interface, and the third wireless interface is a wireless communications interface for communication between the wireless network device and the second terminal device, or the third wireless interface is another wireless communications interface for direct communication between the second terminal device and the first terminal device; and separately sending, by the second terminal device to the first terminal device through the first path and the third path and based on the configuration information, data packets needing to be aggregated.

In the foregoing design, the wireless network device configures the mapping relationship between the two paths of the second terminal device, so that the second terminal device sends, based on the mapping relationship, the data packets needing to be aggregated on the first terminal device to the first terminal device.

In a possible design, the configuration information includes a correspondence between identification information of the first path and identification information of the third path, where the identification information of the first path is a logical channel identifier of the first path; and the identification information of the third path includes a logical channel identifier of the third path and/or a radio bearer identifier of the third path.

In a possible design, the method further includes: receiving, by the second terminal device, a dual connectivity indication sent by the wireless network device, where the dual connectivity indication is used to indicate the second terminal device to send, to the first terminal device through the two paths, the data packets needing to be aggregated.

In the foregoing design, the wireless network device may indicate the second terminal device to enable the dual connectivity indication, so that the second terminal device starts to send, to the first terminal device through the two paths (the first path and the third path), the data packets needing to be aggregated.

In a possible design, the method further includes: receiving, by the second terminal device, a rule for enabling dual connectivity sent by the wireless network device; and when determining that the rule for enabling dual connectivity is satisfied, enabling, by the second terminal device, sending of the data packets needing to be aggregated to the first terminal device through the first path and the third path, where the rule for enabling dual connectivity includes any one or more of the following:

a ProSe per packet priority PPPP corresponding to a data packet currently transmitted by the second terminal device is less than a first threshold;

a ProSe per packet reliability PPPR corresponding to a data packet currently transmitted by the second terminal device is less than a second threshold;

a channel busy ratio CBR of an interface that is currently used by the second terminal device is greater than a third threshold;

a channel busy ratio CBR of an interface that is not currently used by the second terminal device is less than a fourth threshold;

a signal strength of an interface that is currently used by the second terminal device is less than a fifth threshold;

a signal strength of an interface that is not currently used by the second terminal device is greater than a sixth threshold; or a quantity of to-be-transmitted data packets that are of the second terminal device or on one path of the second terminal device is greater than a seventh threshold.

In the foregoing design, the wireless network device configures the rule for enabling dual connectivity for the second terminal device, so that the second terminal device determines when to enable dual connectivity according to the rule for enabling dual connectivity.

According to a fourth aspect, an embodiment of this application provides a communication method, including: sending, by a second terminal device, a first data packet to a first terminal device through a first path, where the first data packet carries an aggregation identifier, and the aggregation identifier is used to indicate a protocol layer entity that is of the first terminal device and at which data packets bearing the aggregation identifier are aggregated, or used to indicate a radio bearer to which the first data packet belongs; and sending, by the second terminal device, a second data packet to the first terminal device through a third path, where the second data packet carries the aggregation identifier, where the first path is borne on a first wireless interface, the first wireless interface is a communications interface for direct communication between the second terminal device and the first terminal device, the third path is borne on a third wireless interface, and the third wireless interface is a communications interface for communication between a wireless network device and the second terminal device, or the third wireless interface is a communications interface for direct communication between the second terminal device and the first terminal device.

In this embodiment of this application, the two data packets sent through the two paths carry the same aggregation identifier, so that the first terminal device determines that the two paths have a mapping relationship, and aggregation processing needs to be performed on the two data packets.

In a possible design, if the third wireless interface is a communications interface for direct communication between the second terminal device and the first terminal device, a first adaptation layer is configured for the first path of the second terminal device, and a second adaptation layer is configured for the third path of the second terminal device; the first adaptation layer of the first data packet includes the aggregation identifier; and the second adaptation layer of the second data packet includes the aggregation identifier.

The first adaptation layer is located between a PDCP layer of the first path and a radio link control protocol RLC layer of the first path, the second adaptation layer is located between a PDCP layer of the third path and an RLC layer of the third path, and the first path and third path of the second terminal device share the same PDCP layer. Alternatively, the first adaptation layer is located above a packet data convergence protocol PDCP layer of the first path, the second adaptation layer is located above a PDCP layer of the third path, the first path and the third path share a same aggregation layer, and the aggregation layer is located above the first adaptation layer and the second adaptation layer.

In the foregoing design, a protocol layer architecture is modified. The adaptation layer is added to each of the two paths, and the same aggregation identifier is added to each of the adaptation layers added to the two paths.

In a possible design, if the first path and third path of the second terminal device share a same PDCP layer, the PDCP layer of the first data packet includes the aggregation identifier; and the PDCP layer of the second data packet includes the aggregation identifier.

In a possible design, if the first path and third path of the second terminal device share a same aggregation layer, and the aggregation layer is located above the PDCP layer of the second terminal device, the aggregation layer of the first data packet includes the aggregation identifier; and the aggregation layer of the second data packet includes the aggregation identifier.

In a possible design, the method further includes: receiving, by the second terminal device, a dual connectivity indication sent by the wireless network device, where the dual connectivity indication is used to indicate the second terminal device to send, to the first terminal device through the two paths, the data packets needing to be aggregated.

In the foregoing design, the wireless network device may indicate the second terminal device to enable the dual connectivity indication, so that the second terminal device starts to send, to the first terminal device through the two paths (the first path and the third path), the data packets needing to be aggregated.

In a possible design, the method further includes: receiving, by the second terminal device, a rule for enabling dual connectivity sent by the wireless network device; and when determining that the rule for enabling dual connectivity is satisfied, enabling, by the second terminal device, sending of the data packets needing to be aggregated to the first terminal device through the first path and the third path, where the rule for enabling dual connectivity includes any one or more of the following:

a ProSe per packet priority PPPP corresponding to a data packet currently transmitted by the second terminal device is less than a first threshold;

a ProSe per packet reliability PPPR corresponding to a data packet currently transmitted by the second terminal device is less than a second threshold;

a channel busy ratio CBR of an interface that is currently used by the second terminal device is greater than a third threshold;

a channel busy ratio CBR of an interface that is not currently used by the second terminal device is less than a fourth threshold;

a signal strength of an interface that is currently used by the second terminal device is less than a fifth threshold;

a signal strength of an interface that is not currently used by the second terminal device is greater than a sixth threshold; or a quantity of to-be-transmitted data packets that are of the second terminal device or on one path of the second terminal device is greater than a seventh threshold.

In the foregoing design, the wireless network device configures the rule for enabling dual connectivity for the second terminal device, so that the second terminal device determines when to enable dual connectivity according to the rule for enabling dual connectivity.

According to a fifth aspect, an embodiment of this application provides a communication method, including: determining, by a wireless network device, a dual connectivity indication; and sending, by the wireless network device, the dual connectivity indication to the second terminal device, where the dual connectivity indication is used to indicate the second terminal device to send, to a first terminal device through two paths, data packets needing to be aggregated.

In this embodiment of this application, the wireless network device sends the dual connectivity indication to the second terminal device, so that the second terminal device enables, only after receiving the indication, sending of the data packets needing to be aggregated on the first terminal device to the first terminal device through the two paths.

In a possible design, before the sending, by the wireless network device, the dual connectivity indication to the second terminal device, the method further includes: determining, by the wireless network device, that at least one parameter reported by the second terminal device satisfies a preset rule.

The preset rule includes any one or more of the following:

a ProSe per packet priority PPPP corresponding to a data packet currently transmitted by the second terminal device is less than a first threshold;

a ProSe per packet reliability PPPR corresponding to a data packet currently transmitted by the second terminal device is less than a second threshold;

a channel busy ratio CBR of an interface that is currently used by the second terminal device is greater than a third threshold;

a channel busy ratio CBR of an interface that is not currently used by the second terminal device is less than a fourth threshold;

a signal strength of an interface that is currently used by the second terminal device is less than a fifth threshold;

a signal strength of an interface that is not currently used by the second terminal device is greater than a sixth threshold; or a quantity of to-be-transmitted data packets that are of the second terminal device or on one path of the second terminal device is greater than a seventh threshold.

In a possible design, the method may further include: receiving, by the wireless network device through a third path, a data packet sent by the second terminal device, where the data packet carries identification information of a first path, the first path is borne on a first wireless interface, the first wireless interface is a communications interface for communication between the first terminal device and the second terminal device, the third path is borne on a third wireless interface, and the third wireless interface is a communications interface for communication between the wireless network device and the second terminal device; receiving, by the wireless network device, destination information sent by the second terminal device, where the destination information includes any one or more of the following: identification information of the first terminal device, a group identifier of a group in which the first terminal device is located, or a service identity to which the data packet belongs; determining, by the wireless network device based on the destination information, a second path for communication between the wireless network device and the first terminal device; and sending, by the wireless network device, the data packet to the first terminal device through the second path.

In a possible design, an adaptation layer is configured for the wireless network device, and the adaptation layer is located above a packet data convergence protocol PDCP layer of the wireless network device, or the adaptation layer is located between a PDCP layer of the wireless network device and a radio link control RLC layer of the wireless network device; and the first adaptation layer of the second data packet carries the identification information of the first path.

In a possible design, that the wireless network device receives, through the third path, the second data packet sent by the second terminal device, and the wireless network device receives the destination information sent by the second terminal device includes: The wireless network device receives, through the third path, the data packet sent by the second terminal device, where the adaptation layer of the data packet carries the identification information of the first path and the destination information.

According to a sixth aspect, an embodiment of this application provides a communication method, including: determining, by a wireless network device, a rule for enabling dual connectivity; and sending, by the wireless network device, the rule for enabling dual connectivity to a second terminal device, where the rule for enabling dual connectivity is used to indicate the second terminal device to enable, when determining that the rule for enabling dual connectivity is satisfied, sending of data packets needing to be aggregated to the first terminal device through two paths, where the rule for enabling dual connectivity includes any one or more of the following:

a ProSe per packet priority PPPP corresponding to a data packet currently transmitted by the second terminal device is less than a first threshold;

a ProSe per packet reliability PPPR corresponding to a data packet currently transmitted by the second terminal device is less than a second threshold;

a channel busy ratio CBR of an interface that is currently used by the second terminal device is greater than a third threshold;

a channel busy ratio CBR of an interface that is not currently used by the second terminal device is less than a fourth threshold;

a signal strength of an interface that is currently used by the second terminal device is less than a fifth threshold;

a signal strength of an interface that is not currently used by the second terminal device is greater than a sixth threshold; or a quantity of to-be-transmitted data packets that are of the second terminal device or on one path of the second terminal device is greater than a seventh threshold.

According to a seventh aspect, an embodiment of this application provides a communication method, including:

receiving, by a second wireless network device through a third path, a data packet sent by a second terminal device, where the data packet carries identification information of a first path, the first path is borne on a first wireless interface, the first wireless interface is a communications interface for communication between a first terminal device and the second terminal device, the third path is borne on a third wireless interface, and the third wireless interface is a communications interface for communication between the second wireless network device and the second terminal device; and the second wireless network device serves the second terminal device; and sending, by the second wireless network device, the data packet to a first wireless network device through a user plane forwarding tunnel between the second wireless network device and the first wireless network device, where the first wireless network device serves the first terminal device. In this case, after receiving the data packet, the first wireless network device determines a second path for communication between the first wireless network device and the first terminal device. The second path is borne on a second wireless interface, and the second wireless interface is a communications interface for communication between the first wireless network device and the first terminal device.

In this embodiment of this application, the second wireless network device not only sends the identification information of the first path as a user plane bearer to the first wireless network device in the foregoing sending process of the data packet, but also can send the identification information of the first path to the first wireless network device via a control plane or a user plane after obtaining the identification information of the first path.

According to an eighth aspect, this application provides a communications apparatus. The communications apparatus has a function of implementing the first terminal device in the first aspect. For example, the communications apparatus includes a corresponding module, unit, or means (means) for performing a step by the first terminal device in the first aspect. The function, the unit, or the means (means) may be implemented by using software, or may be implemented by using hardware, or may be implemented by using hardware executing corresponding software. Alternatively, the communications apparatus has a function of implementing the second terminal device in any one of the second aspect to the fourth aspect, or has a function of the wireless network device in the fifth aspect or the seventh aspect.

In a possible design, the communications apparatus includes a processing unit and a transceiver unit, and functions performed by the processing unit and the transceiver unit may correspond to steps performed by the first terminal device in the first aspect, or correspond to steps performed by the second terminal device in any one of the second aspect to the fourth aspect, or correspond to steps performed by the wireless network device in any one of the fifth aspect to the seventh aspect. Details are not described herein again.

In another possible design, the communications apparatus includes a processor, and may further include a transceiver. The transceiver is configured to receive and send a signal. The processor executes a program instruction, to complete the method performed by the first terminal device in any one of the first aspect or the possible designs or implementations of the first aspect, the method performed by the second terminal device in any one of the second aspect to the fourth aspect, or the method performed by the wireless network device in any one of the fifth aspect to the seventh aspect.

The communications apparatus may further include one or more memories. The memories are configured to be coupled to the processor, and store computer program instructions and/or data that are necessary for implementing a function of the first terminal device in the first aspect. The one or more memories may be integrated with the processor, or may be separated from the processor. This is not limited in this application. The processor may execute the computer program instructions stored in the memories, to complete the method performed by the first terminal device in any one of the first aspect or the possible designs or implementations of the first aspect, the method performed by the second terminal device in any one of the second aspect to the fourth aspect, or the method performed by the wireless network device in any one of the fifth aspect to the seventh aspect.

According to a ninth aspect, this application provides a chip. The chip may communicate with a memory, or the chip includes a memory. The chip executes a program instruction stored in the memory, to implement a function corresponding to the first terminal device, the second terminal device, or the wireless network device (including the first wireless network device and the second wireless network device) in the first aspect to the seventh aspect.

According to a tenth aspect, this application provides a computer storage medium. The computer storage medium stores a computer-readable instruction. When the computer-readable instruction is executed, a function corresponding to the first terminal device, the second terminal device, or the wireless network device (including the first wireless network device and the second wireless network device) in the first aspect to the seventh aspect is implemented.

According to an eleventh aspect, this application further provides a computer program product including a software program. When the computer program product runs on a computer, a function corresponding to the first terminal device, the second terminal device, or the wireless network device (including the first wireless network device and the second wireless network device) in the first aspect to the seventh aspect is implemented.

According to a twelfth aspect, this application further provides a communications system. The communications system includes the first terminal device, and/or the second terminal device, and/or, the wireless network device (which may include a first wireless network device and a second wireless network device) in the first aspect to the seventh aspect.

DESCRIPTION OF EMBODIMENTS

For ease of understanding, a scenario to which embodiments of this application are applicable is first described with reference to FIG. 1.

Figure 1:
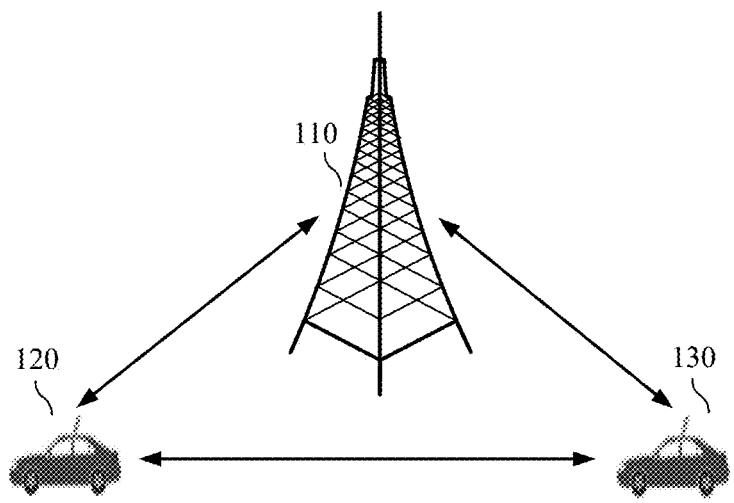
FIG. 1 is a schematic diagram of a communications system applied to an embodiment of this application.

FIG. 1 shows a communications system applied to an embodiment of this application. The wireless communications system may include a wireless network device 110 and a terminal device. The wireless network device 110 may be a device communicating with the terminal device. The wireless network device 110 can provide communication coverage for a specific geographical area, and can communicate with a terminal device located within the coverage area.

FIG. 1 shows an example in which one wireless network device 110 and two terminals (a first terminal device 120 and a second terminal device 130) are included. Optionally, the wireless communications system may include a plurality of wireless network devices, and there may be another quantity of terminals within coverage of each wireless network device. This is not limited in this embodiment of this application.

Optionally, the wireless communications system may further include another network entity such as a network controller or a mobility management entity. This is not limited in this embodiment of this application.

In the embodiments of this application, the wireless network device may be referred to as a radio access network (radio access network, RAN) device, and may be, for example, a base station, a transmit and receive point (transmit and receive point, TRP), or an access node. The access node may be specifically a base transceiver station in a global system for mobile communications (global system for mobile communication, GSM) system or code division multiple access (code division multiple access, CDMA) system, or may be a NodeB (NodeB) in a wideband code division multiple access (wideband code division multiple access, WCDMA) system, or may be an evolved NodeB (evolutional node B, eNB or eNodeB) in an LTE system, or may be a base station device, a small cell device, a wireless access point (WiFi AP), a worldwide interoperability for microwave access base station (worldwide interoperability for microwave access base station, WiMAX BS), or the like in a 5G network. This is not limited in this application.

In the embodiments of this application, the terminal may include but is not limited to a terminal device applied to an internet of vehicles, and may be, for example, a terminal device accessing the internet of vehicles, for example, a vehicle-mounted terminal device. The terminal may also be referred to as an access terminal, user equipment (user equipment, UE), a subscriber unit, a subscriber station, a mobile station, a remote station, a remote terminal, a mobile device, a user terminal, a wireless communications device, a user agent, a user apparatus, or the like. The terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, an internet of things terminal device, or an internet of vehicles terminal device, where the internet of things terminal device is, for example, a fire detection sensor, a smart water meter/electricity meter, or a factory monitoring device.

In the wireless communications system shown in FIG. 1, the second terminal device 130 may communicate with the first terminal device 120 through a direct wireless interface. The direct wireless interface may be understood as an air interface for direct communication between the terminal devices, and may be, for example, a PC5 interface in an internet of vehicles. The PC5 interface includes a PC5 interface defined in the LTE system or a PC5 interface defined in an NR system (New Radio, which is a new standard), which are referred to as LTE PC5 and NR PC5 in the following descriptions. Data is transmitted between the terminals through the direct wireless interface, and the wireless network device does not need to participate in the data transmission process. This helps reduce a delay of data transmission between the terminal devices. The first terminal device 120 may alternatively communicate with the second terminal device 130 through an indirect wireless interface. The indirect wireless interface may be understood as a wireless interface for communication between the second terminal device 130 and the wireless network device 110 and a wireless interface for communication between the wireless network device 110 and the first terminal device 120, and may be, for example, a Uu interface. The Uu interface also includes a Uu interface defined in the LTE system or a Uu interface defined in the NR system (which is a new standard), which are referred to as LTE Uu and NR Uu in the following descriptions.

Currently, in the 3rd Generation Partnership Project (3rd generation partnership project, 3GPP), data splitting and aggregation on an LTE PC5 interface based on carrier aggregation (carrier aggregation, CA) are being discussed. The data splitting and aggregation specifically refer to packet duplication at a transmit end and reordering and duplicate packet detection at a receive end. Data splitting and aggregation in implementations of this application include two cases. In a first case, packet duplication and packet splitting (packet split) are performed at the transmit end, and reordering and duplicate packet detection are performed at the receive end. In a second case, packet splitting is performed at the transmit end, and reordering and duplicate packet detection are performed at the receive end. From a perspective of the transmit end, the packet duplication means that the transmit end duplicates a data packet. The packet splitting means that the transmit end sends, to the receive end through a plurality of different paths, a plurality of data packets belonging to a same aggregation protocol layer entity. The plurality of data packets may have a same SN number or different SN numbers. For example, the transmit end sends, to the receive end through a plurality of different paths, a plurality of same data packets (namely, data packets having a same SN number) obtained after the duplication, or sends, to the receive end through a plurality of different paths, a plurality of different data packets (namely, data packets having different SN numbers) on which the duplication has not been performed. From a perspective of the receive end, packet reordering and duplicate packet detection mean that the receive end sends data received through different paths to a same aggregation layer entity, and performs reordering and duplicate packet detection based on sequence numbers SNs of the data packets. The duplicate packet detection means that, when the aggregation layer entity finds that a sequence number SN=2 appears repeatedly, only one data packet with the sequence number SN=2 is reserved, and other data packets with the sequence number SN=2 are deleted. The foregoing paths are borne on wireless interfaces for transmission between the transmit end and the receive end. For example, one path is borne on a PC5 interface, and another path is borne on a Uu interface. For another example, one path is borne on a PC5 interface in the NR standard, and another path is borne on a PC5 interface in the LTE standard. For another example, two paths are both borne on PC5 interfaces in the NR standard, or two paths are both borne on PC5 interfaces in the LTE standard.

The receive end cannot learn of paths, where data packets received through the paths need to be aggregated to a same aggregation protocol layer entity.

In view of this, the embodiments of this application provide a communication method and a communications apparatus. Therefore, before aggregating data packets, a receive end obtains a mapping relationship between different paths, to determine that data aggregation needs to be performed on data packets received through a plurality of paths having the mapping relationship. This resolves an existing problem that a receive end does not learn of paths (where data packets received through the paths need to be aggregated).

In addition, for example, the term "and/or" in this specification describes only an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects.

Figure 2:
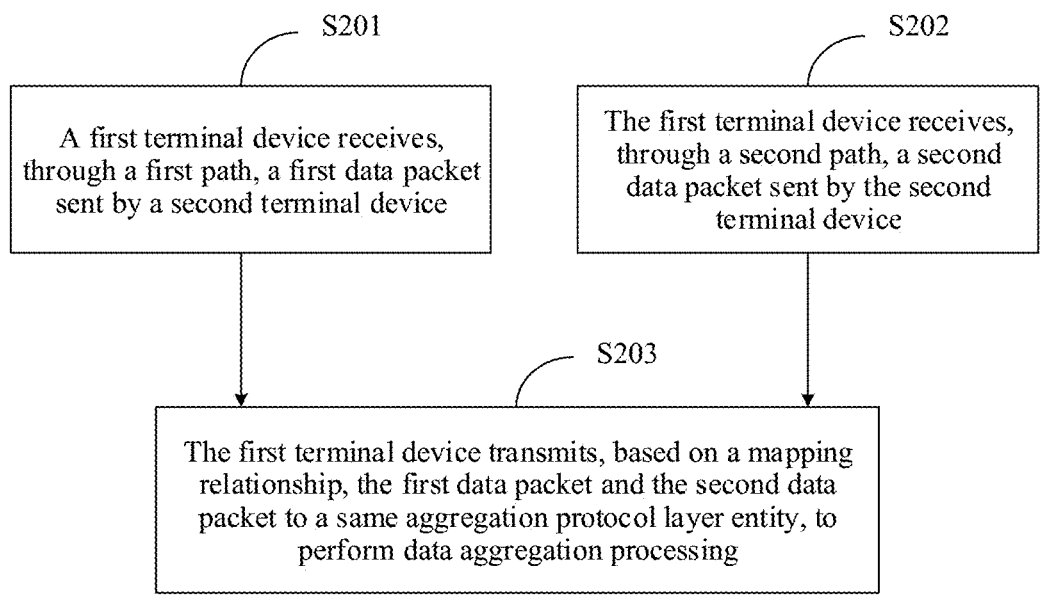
FIG. 2 is a schematic flowchart of a communication method according to an embodiment of this application.

FIG. 2 is a schematic flowchart of a communication method according to an embodiment of this application. It should be understood that a first terminal device shown in FIG. 2 may be the first terminal device 130 shown in FIG. 1, or a chip located on the first terminal device 130, or a communications module located on the first terminal device 130; and a second terminal device shown in FIG. 2 may be the second terminal device 120 shown in FIG. 1, or a chip located on the second terminal device 120, or a communication module located on the second terminal device 120.

S201: The first terminal device receives, through a first path, a first data packet sent by the second terminal device.

For example, the second terminal device sends the first data packet to the first terminal device through the first path, so that the first terminal device receives the first data packet through the first path.

The first path is borne on a first wireless interface, and the first wireless interface is a wireless communications interface for direct communication between the second terminal device and the first terminal device.

S202: The first terminal device receives, through a second path, a second data packet sent by the second terminal device.

The second path is borne on a second wireless interface.

In a first possible implementation, the second wireless interface is another wireless communications interface for direct communication between the second terminal device and the first terminal device.

For example, the first wireless interface may be the foregoing direct wireless interface for direct communication between terminal devices, for example, the PC5 interface in the internet of vehicles. For example, the second terminal device sends the first data packet to the first terminal device through the first path (for example, a logical channel 1) of an LTE PC5 interface or NR PC5 interface. The second wireless interface may be another direct wireless interface for direct communication between the terminal devices. The first wireless interface and the second wireless interface may be direct wireless interfaces in a same communication standard. For example, the two interfaces are both wireless interfaces in the NR standard or both wireless interfaces in the LTE standard. The first wireless interface and the second wireless interface may alternatively be direct wireless interfaces in different communication standards. For example, one of the two interfaces is a wireless interface in the NR standard, and the other one is a wireless interface in the LTE standard. For example, the second terminal device sends the second data packet to the first terminal device through the second path (for example, a logical channel 2) of the LTE PC5 interface or NR PC5 interface.

In a second possible implementation, the second wireless interface is a wireless communications interface for communication between a wireless network device and the first terminal device, and is also referred to as an indirect wireless interface, for example, a Uu interface. For example, the second terminal device may transmit a data packet to the wireless network device through a third path, so that the wireless network device transmits the data packet to the first terminal device through the second path borne on the second wireless interface. The third path is borne on a third wireless interface, and the third wireless interface is a wireless communications interface for communication between the second terminal device and the wireless network device, for example, a Uu interface. For example, the second terminal device sends the second data packet to the wireless network device through the third path (for example, a logical channel 3 or a radio data bearer 3) of an LTE Uu interface or NR Uu interface. For example, the wireless network device sends the second data packet to the first terminal device through the second path (for example, a logical channel 2 or a radio data bearer 2) of an LTE Uu interface or NR Uu interface.

The first path has a mapping relationship with the second path. The mapping relationship is used to indicate that a data packet received through the first path and a data packet received through the second path need to be aggregated in a same aggregation protocol layer entity.

In this embodiment of this application, a manner in which the first terminal device determines that the first path has the mapping relationship with the second path may include, but not limited to, the following manners.

In a first possible manner, if the second data packet received through the second path carries identification information of the first path, the first path has the mapping relationship with the second path.

In a second possible manner, the first terminal device receives configuration information sent by the wireless network device, where the configuration information is used to indicate that the first path has the mapping relationship with the second path. The configuration information may include a correspondence between identification information of the first path and identification information of the second path.

In this embodiment of this application, the identification information of the first path may be a logical channel identifier or logical channel identifier list of the first path. The identification information of the second path may be a logical channel identifier of the second path and/or a radio bearer identifier of the second path. To be specific, the identification information of the second path may be a logical channel identifier of the second path, or the identification information of the second path may be a radio bearer identifier of the second path, or the identification information of the second path may include a logical channel identifier of the second path and a radio bearer identifier of the second path.

In a third possible manner, an aggregation identifier carried in an aggregation protocol layer of the first data packet is the same as an aggregation identifier carried in an aggregation protocol layer of the second data packet. The aggregation identifier is used to indicate a radio data bearer to which a data packet carrying the aggregation identifier belongs or a corresponding aggregation protocol layer entity. The aggregation protocol layer may be a PDCP protocol layer, or may be a newly added protocol layer. For ease of description, the newly added protocol layer is referred to as an aggregation layer.

In a fourth possible manner, if the first data packet received through the first path carries identification information of the second path, the first path has the mapping relationship with the second path.

In a fifth possible manner, a mapping rule is pre-configured for the first terminal device, so that the first terminal device determines, according to the pre-configured mapping rule, that the first path has the mapping relationship with the second path.

Optionally, the fifth possible manner is applicable to a case in which both the first wireless interface and the second wireless interface are direct wireless interfaces. For example, when the second terminal device first establishes the LTE PC5 interface, a logical channel identifier (logical channel identifier, LCID) of the path of the LTE PC5 interface ranges from 1 to 10; and when the second terminal device establishes the NR PC5 interface later, an NR PC5 LCID ranges from 11 to 20. LTE PC5 LCID=1 has a mapping relationship with NR PC5 LCID=11, LTE PC5 LCID=2 has a mapping relationship with NR PC5 LCID=12, and so on or vice versa.

In the fifth possible manner, both the first terminal device and the second terminal device may determine, in this manner, that the first path has the mapping relationship with the second path.

S203: The first terminal device transmits, based on the mapping relationship, the first data packet and the second data packet to a same aggregation protocol layer entity, to perform data aggregation processing.

Optionally, in the second possible implementation, when the second wireless interface is an indirect wireless interface, the first terminal device that receives the second data packet through the second path borne on the second wireless interface may belong to a terminal device set. To be specific, the second terminal device transmits the second data packet to the wireless network device through the third path; and after receiving the second data packet, the wireless network device may help the second terminal device send the second data packet to a terminal device set in multicast or broadcast mode. The terminal device set includes the first terminal device.

In the second possible implementation, the first terminal device and the second terminal device may be managed by a same wireless network device. In other words, the first terminal device and the second terminal device access the same wireless network device. The foregoing wireless network device that helps the second terminal device forward the second data packet to the first terminal device is the wireless network device accessed by the first terminal device and the second terminal device. The first terminal device and the second terminal device may alternatively be managed by different wireless network devices. For ease of differentiation, a wireless network device accessed by the first terminal device is referred to as a first wireless network device, and a wireless network device accessed by the second terminal device is referred to as a second network device. In this case, the foregoing wireless network device that helps the second terminal device forward the second data packet to the first terminal device includes the first wireless network device and the second wireless network device.

In this embodiment of this application, as a receive end, the first terminal device learns of the mapping relationship between the first path and the second path, and then can determine that the data packet received through the first path and the data packet received through the second path need to be aggregated in the same aggregation protocol layer entity for further data aggregation processing. In this embodiment of this application, although the data packets are separately transmitted through two different paths, the data packets are finally aggregated in the same aggregation protocol layer entity.

To send the data packets transmitted separately through the two paths borne on the two wireless interfaces to the same aggregation protocol layer entity to perform data aggregation, in this embodiment of this application, an existing protocol stack is improved to provide a plurality of different protocol stacks. The following describes in detail an architecture of each protocol stack and a manner of transmitting a data packet with reference to the accompanying drawings. The first case of the data splitting and aggregation is as an example below for description. A processing process in the first case is similar to a processing process in the second case, and only a difference lies in that, in the first case, when the transmit end performs processing, packet duplication is further included; in the second case, only splitting is performed, and no duplication operation is performed on the data packet. A specific process for the second case is not described again.

In a first protocol stack architecture, the first wireless interface bearing the first path is a direct wireless interface for direct communication between the second terminal device and the first terminal device, the second wireless interface bearing the second path is an indirect wireless interface for communication between the wireless network device and the first terminal device, and the third wireless interface bearing the third path is an indirect wireless interface for communication between the second terminal device and the wireless network device. Both the first terminal device and the second terminal device are managed by the wireless network device.

Figure 3:
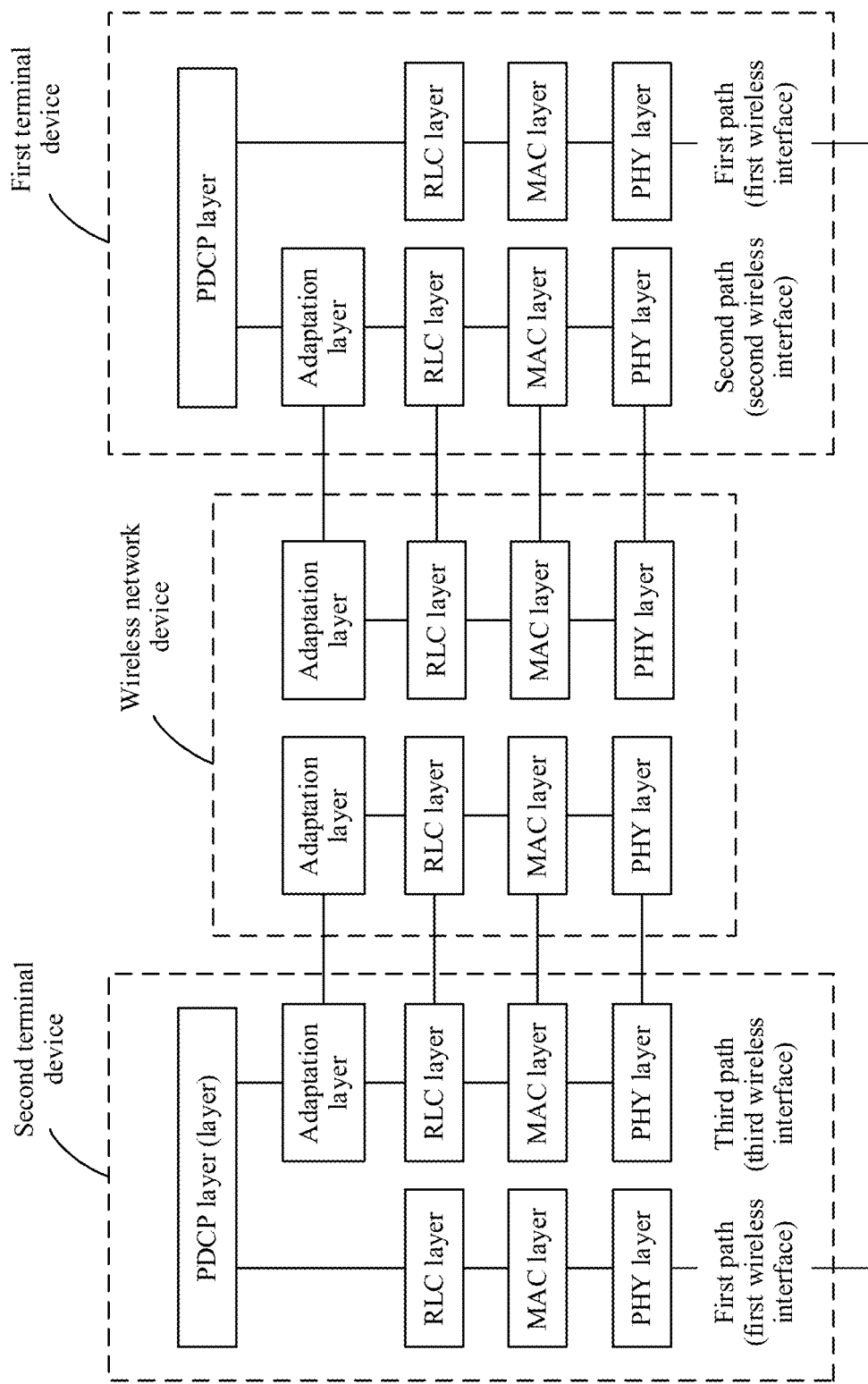
FIG. 3 is a schematic block diagram of a first protocol stack architecture according to an embodiment of this application.

FIG. 3 is a schematic architectural diagram of protocol layers in the first terminal device, the second terminal device, and the wireless network device. FIG. 3 shows only protocol layers that are in the first terminal device, the second terminal device, and the wireless network device and related to this embodiment of this application. The first terminal device, the second terminal device, and the wireless network device may further include another protocol layer. This is not specifically limited in this embodiment of this application.

In FIG. 3, an adaptation layer (adaption layer) is added to each of protocol stack architectures corresponding to the second path and the third path that are borne on indirect wireless interfaces and between the first terminal device and the second terminal device. The adaptation layer may be located between a packet data convergence protocol (packet data convergence protocol, PDCP) layer and a radio link control protocol (radio link control, RLC) layer. For example, on the second path, for each of the first terminal device and the wireless network device, an adaptation layer is configured between a PDCP layer and an RLC layer; and on the third path, for each of the second terminal device and the wireless network device, an adaptation layer is configured between a PDCP layer and an RLC layer. The first path and the second path in the first terminal device share a same PDCP layer, and the first path and the third path in the second terminal device share a same PDCP layer.

The protocol stack architecture shown in FIG. 3 may be applicable to the first possible manner of determining that the first path has the mapping relationship with the second path. In this case, the adaptation layer of the second data packet carries the identification information of the first path.

The following describes in detail a process of transmitting the data packets through the three paths in the first possible manner.

After performing duplication processing on a to-be-sent data packet at the PDCP layer, the second terminal device may obtain the first data packet and the second data packet. The duplication processing may be that the to-be-sent data packet is duplicated to obtain the first data packet and the second data packet that are the same. In other words, a sequence number of the first data packet is the same as a sequence number of the second data packet. When the first data packet and the second data packet that have different sequence numbers are split through different paths, duplication processing may not be performed.

The second terminal device adds the identification information of the first path to the second data packet at the adaptation layer of the third path. Then, after being processed by entities at the RLC layer of the third path and a layer below the RLC layer, the second data packet is sent to the wireless network device through the third wireless interface.

No adaptation layer is configured for the first path. Therefore, the first data packet directly reaches an RLC layer without passing through an adaptation layer. After being processed by entities at the RLC layer of the first path and a layer below the RLC layer, the first data packet is sent to the first terminal device through the first wireless interface.

Optionally, the second terminal device may further add source information (Source Information, Src Info) and destination information (destination Information, Dst Info) to the second data packet at the adaptation layer of the third path.

Specifically, the source information is used to indicate the second terminal device, and may be, for example, address information used by the first wireless interface to identify the second terminal device, for example, an internet protocol (internet protocol, IP) address or a media access control (media access control, MAC) address. For example, the source information may alternatively be identification information or service identity information of the second terminal device. The identification information of the second terminal device may be an ID of a second terminal device in proximity-based service communication, for example, a ProSe layer UE identity (ProSe UE ID), a ProSe layer-2 group identity (ProSe layer 2 group ID), a destination layer-2 identity (destination layer 2 ID), a platoon group identity (platoon group ID), a multimedia broadcast and multicast service session (multimedia broadcast and multicast service session, MBMS session) identity, a temporary mobile group identity (temporary mobile group identity, TMGI), or a RAN group identity ((for example, a G-RNTI) or another identity that is uniquely allocated by the wireless network device to a specific service; or may be an international mobile subscriber identity (international mobile subscriber identification identity, IMSI), a temporary identity that may be allocated to the second terminal device to protect privacy, location information of the second terminal device, or the like.

Specifically, the destination information is similar to the source information, and may include address information used by the first wireless interface to identify the first terminal device, for example, address information (such as an IP address or a MAC address) of the first terminal device or identification information (such as a ProSe UE ID, a ProSe Layer-2 group ID, a destination layer-2 ID, a platoon group ID, or an IMSI) of the first terminal device; or include a service identity (such as an MBMS session ID or a TMGI) of the second data packet; or include address information of a group to which the first terminal device belongs or a group identifier of a group to which the first terminal device belongs, for example, an IP multicast address corresponding to the group to which the first terminal device belongs, a MAC multicast address of the group to which the first terminal device belongs, or a group ID that is allocated by a network and of the group to which the first terminal device belongs.

When the adaptation layer carries the destination information, the wireless network device directly finds, based on the destination information, an identifier of the corresponding first terminal device on the second wireless interface. For example, when the destination information is address information (such as an IP address or a MAC address) of the first terminal device, the wireless network device performs matching based on address information previously reported by the first terminal device. For example, when an IP address or a MAC address reported by a terminal device corresponding to a user whose cell radio network temporary identifier (cell radio network temporary identifier, C-RNTI) is x is y, a corresponding C-RNTI or another network identifier may be found based on the IP address y or the MAC address y. For example, when the destination information is identification information (such as a ProSe UE ID, a ProSe layer-2 group ID, a destination layer-2 ID, a platoon group ID, or an IMSI) of the first terminal device, the wireless network device performs matching based on address information previously reported by the first terminal device. For example, when the ProSe layer-2 group ID/destination layer-2 ID/IMSI identity reported by a user whose C-RNTI identifier is x is y, a corresponding C-RNTI or another RAN identity may be found based on the address information. For example, when the destination information is the RAN group identity or a service identity (such as an MBMS session ID or a TMGI) of a data packet carrying the destination information, the wireless network device directly determines that the identifier of the first terminal device on the second interface is the MBMS session ID, the TMGI, or the RAN group identity.

Optionally, the wireless network device may alternatively obtain the destination information based on an indication of the second terminal device. For example, the second terminal device indicates the destination information to the wireless network device by using a radio resource control (radio resource control, RRC) message. A manner of obtaining the destination information by the wireless network device is not specifically limited in this embodiment of this application. If the second terminal device indicates the destination information to the wireless network device by using the RRC message, the destination information does not need to be carried in the adaptation layer.

In addition, the identification information of the first path may alternatively be carried in another manner, for example, carried in a MAC subheader of the third path. The MAC subheader of the third path originally carries a logical channel identifier of the third path. By additionally adding the identification information of the first path to the MAC subheader of the third path, it is determined that the first path has a mapping relationship with the third path. After obtaining the mapping relationship between the first path and the third path, the wireless network device determines the mapping relationship between the first path and the second path. The identification information of the first path is added to a MAC subheader of the second path. The receive end determines, based on the logical channel identifier of the second path and the identification information of the first path that are carried in the MAC subheader of the second path, that the first path has the mapping relationship with the second path.

Optionally, processing processes of the first data packet and the second data packet at the RLC layer and below the RLC layer may be basically the same as a process of transmitting a data packet in the prior art, and details are not described herein.

After receiving the second data packet through the third path borne on the third wireless interface, the wireless network device determines the first terminal device of the second data packet based on the destination information carried in the adaptation layer in the wireless network device, and then determines the second path for communication between the wireless network device and the first terminal device. The wireless network device sends the second data packet carrying the identification information of the first path to the first terminal device. When determining the second path for communication between the wireless network device and the first terminal device, the wireless network device determines the mapping relationship between the first path and the second path after determining the first terminal device based on the destination information, to obtain the second path for communication between the wireless network device and the first terminal device. Specifically, after receiving the second data packet, the wireless network device determines that a destination node of the second data packet is the identifier of the first terminal device on the second wireless interface. When the destination node of the second data packet is a single node, that is, in a case of unicast, the identifier of the first terminal device on the second wireless interface is a unique identifier in a cell, for example, a C-RNTI or another RAN identity. When the destination node of the second data packet includes a plurality of nodes, that is, in a case of multicast (in other words, when the destination node of the second data packet includes a plurality of first terminal devices), identifiers of the first terminal devices on the second wireless interface are a group identity (for example, a platoon group ID), a service identity (for example, an MBMS session ID or a TMGI), or a RAN group identifier (for example, a group radio network temporary identifier, G-RNTI) that is uniquely allocated to a service. The wireless network device may perform no processing on the adaptation layer; or delete other information than the identification information of the first path, directly send the second data packet carrying the adaptation layer to the RLC layer of the second path, and send the second data packet to the first terminal device through the second wireless interface after the second data packet is processed by entities at the RLC layer of the second path and a layer below the RLC layer.

After receiving the second data packet through the second path, the first terminal device determines that the adaptation layer of the second data packet carries the identification information of the first path, and then determines that the first path has the mapping relationship with the second path. Then, the first terminal device transmits both the first data packet received through the first path and the second data packet received through the second path to the same aggregation protocol layer entity to perform data aggregation processing, that is, performs data aggregation processing in a same PDCP layer entity. The data aggregation processing includes reordering and duplicate packet detection. Specifically, ordering is performed based on PDCP SN numbers. When a data packet having a specific PDCP SN number appears repeatedly, a repeated data packet is deleted, and only one data packet corresponding to the PDCP SN number is retained.

Optionally, if the adaptation layer is used to notify the first terminal device that the first path has the mapping relationship with the second path, the first terminal device needs to learn of existence of the adaptation layer, so that the first terminal device can obtain the identification information of the first path from the adaptation layer of the second data packet. A manner of learning of existence of the adaptation layer includes: The wireless network device sends indication information to the first terminal device, where the indication information is used to indicate that the adaptation layer is configured for the second path of the second wireless interface of the first terminal device. For example, the wireless network device may include the indication information in an RRC message, or include the indication information in downlink control information (Downlink Control Information, DCI), or indicate the existence at another protocol layer. For example, an RLC header or a MAC subheader indicates the existence of the adaptation layer. Another manner of learning of existence of the adaptation layer is: When forwarding the second data packet to the first terminal device, the wireless network device includes the indication information in a MAC layer of the second data packet. Still another manner of learning of existence of the adaptation layer is: If the first path of the first wireless interface is established first, and then the second path of the second wireless interface is established, a base station can configure the adaptation layer for the second path of the first terminal device when establishing the second path of the second wireless interface. If the second path of the second wireless interface is first established, the base station may reconfigure the second path in the RRC message, that is, indicate existence of the adaptation layer.

A PDCP entity of the first terminal device performs data aggregation on the first data packet and the second data packet. When the first data packet and the second data packet are generated based on a same data packet, in other words, the first data packet is a duplicate of the second data packet, or the second data packet is a duplicate of the first data packet, the PDCP entity may discard either of the first data packet and the second data packet. If the first data packet and the second data packet are not generated based on a same data packet, in other words, sequence numbers of the first data packet and the second data packet are different, the PDCP entity of the first terminal device reorders the first data packet and the second data packet.

In the protocol stack architecture shown in this embodiment of this application, based on a function of aggregating data packets by the PDCP layer in an existing protocol stack, the first data packet received through the first path and the second data packet received through the second path are aggregated. The existing protocol stack is slightly changed. A detailed aggregation process is not described herein.

Optionally, the second terminal device obtains the first data packet and the second data packet after duplicating the to-be-sent data packet at the PDCP layer, sends the first data packet through the first path of the second terminal device, and sends the second data packet through the third path of the second terminal device.

For example, the second terminal device may learn, in any one of the following manners, that the first path has the mapping relationship with the third path.

In a possible manner 1, the wireless network device configures the mapping relationship between the first path borne on the first wireless interface and the third path borne on the third wireless interface.

For example, the wireless network device sends first configuration information to the second terminal device, where the first configuration information is used to indicate that the first path has the mapping relationship with the third path. The first configuration information may include the correspondence between the identification information of the first path and the identification information of the second path. The identification information of the first path may be a logical channel identifier or logical channel identifier list of the first path, and the logical channel identifier list includes the logical channel identifier of the first path. The identification information of the third path includes a logical channel identifier of the third path and/or a radio bearer identifier of the third path.

For example, the identification information of the first path is a PC5 LCID (PC5 LCID list), and the identification information of the third path is a Uu LCID/Uu DRB ID. The wireless network device provides the Uu LCID/Uu DRB ID and the corresponding PC5 LCID (or PC5 LCID list) in the first configuration information. Optionally, the first configuration information may further include destination information of a receive end corresponding to the PC5 LCID (or the PC5 LCID list) (for details, refer to the foregoing descriptions), so that the transmit end (the second terminal device) identifies a receive end (which is the first terminal device herein), a PC5 interface between the second terminal device and the receive end, and a Uu interface, where a path of the PC5 interface is bound to a path of the Uu interface.

Optionally, the wireless network device may send the first configuration information to the second terminal device by using an RRC message, a broadcast message, or a MAC control element (control element, CE) CE.

In a possible manner 2, when determining that data packets that need to be aggregated are sent to the first terminal device through two paths, the second terminal device autonomously determines a path of the first wireless interface and a path of the third wireless interface, where the path of the first wireless interface has a mapping relationship with the path of the third wireless interface.

In a possible implementation, in the possible manner 2 of determining that the first path has the mapping relationship with the third path, when the second terminal device determines, according to a rule for enabling dual connectivity, to enable dual connectivity, the second terminal device may autonomously determine a path of the PC5 interface and a path of the Uu interface, where the path of the PC5 interface is bound to the path of the Uu interface. Specifically, for how to determine, when dual connectivity is used, two paths having the mapping relationship, refer to detailed descriptions in the following when the rule for enabling dual connectivity is described.

In a second protocol stack architecture, the first wireless interface bearing the first path is a direct wireless interface for direct communication between the second terminal device and the first terminal device, the second wireless interface bearing the second path is an indirect wireless interface for communication between the first wireless network device and the first terminal device, and the third wireless interface bearing the third path is an indirect wireless interface for communication between the second terminal device and the second wireless network device. The first terminal device is managed by the first wireless network device, and the second terminal device is managed by the second wireless network device. A protocol stack architecture of the first terminal device, the second terminal device, the first wireless network device, and the second wireless network device is shown in FIG. 4.

Figure 4:
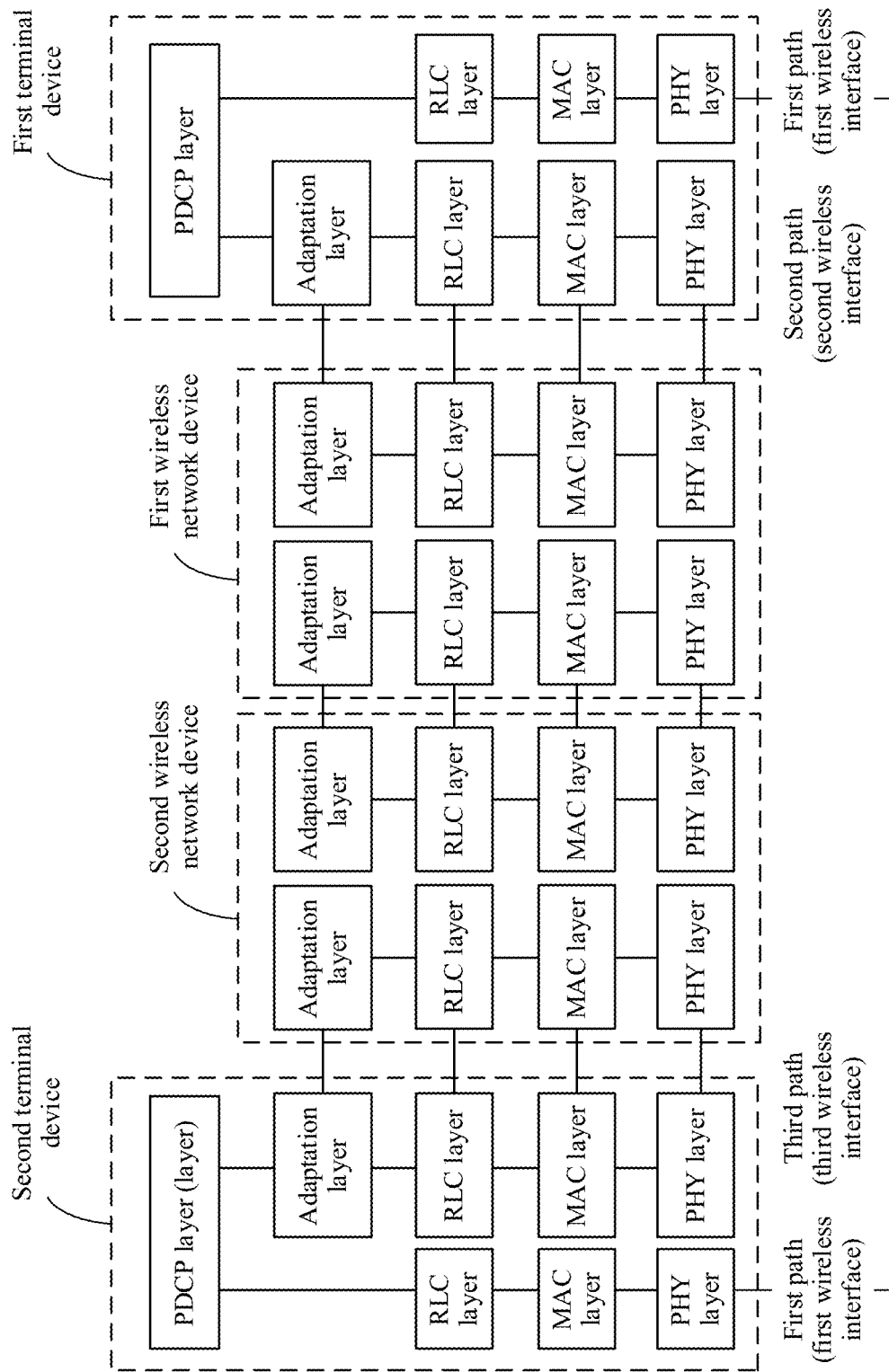
FIG. 4 is a schematic block diagram of a second protocol stack architecture according to an embodiment of this application.

The protocol stack architecture shown in FIG. 4 is basically the same as the protocol stack architecture shown in FIG. 3. For detailed descriptions, refer to the foregoing descriptions of the first protocol stack architecture. The following focuses on a difference from the protocol stack architecture shown in FIG. 3.

The first terminal device accesses the first wireless network device, and the second terminal device accesses the second wireless network device. Therefore, in a process of transmitting the second data packet to the first terminal device, the second terminal device needs to forward the second data packet via the two wireless network devices. When receiving, through the third path, the second data packet sent by the second terminal device, the second wireless network device may send the second data packet carrying an adaptation layer (including the identification information of the first path) to the first wireless network device through a user plane forwarding tunnel established between the second wireless network device and the first wireless network device, so that the first wireless network device determines the first terminal device based on destination information included in the adaptation layer carried in the second data packet, and then sends the second data packet carrying the adaptation layer to the first terminal device through the second path of the second wireless interface. For another processing process, refer to the descriptions of the protocol stack architecture shown in FIG. 3. Details are not described herein again.

In a protocol stack shown in FIG. 4, the second wireless network device may notify, in a GPRS (where GPRS is short for general packet radio service (general packet radio service)) tunneling protocol for the user plane (GPRS Tunnelling Protocol for the user plane, GTP-U) header that bears the second data packet, the first wireless network device that the second data packet carries the adaptation layer; after receiving the notification, the first wireless network device notifies the first terminal device, so that the first terminal device learns that the adaptation layer is configured for the second path. For example, the first wireless network device may include indication information in an RRC message or downlink control information (Downlink Control Information, DCI), or include indication information in an RLC header or a MAC subheader. The indication information is used to indicate that the adaptation layer is configured for the second path of the first terminal device.

Optionally, the second terminal device may learn, in the possible manner 1 in the protocol stack architecture in FIG. 3, that the first path has the mapping relationship with the third path. Details are not described herein again.

Optionally, the second wireless network device may determine, in the following manner, that a wireless network device accessed by the first terminal device is the first wireless network device, and then determine a wireless network device to which the second data packet received by the second wireless network device is forwarded: When a destination node of the second data packet is a single node, that is, in a case of unicast, when determining that the first terminal device is not within coverage of the second wireless network device, the second wireless network device may initiate a query to a wireless network device in a neighboring cell. For example, the second wireless network device determines, based on destination information corresponding to the second data packet (for example, an L2 ID of the first terminal device on the first wireless interface, including but not limited to an IP address, a MAC address, a ProSe UE ID, a ProSe layer-2 group ID, a destination layer-2 ID, or a platoon group ID), whether the first terminal device is within the coverage of the second wireless network device. The second wireless network device determines a wireless network device based on information fed back by the wireless network device in the neighboring cell, where the first terminal device is within the coverage of the wireless network device. In addition, neighboring wireless network devices exchange an L2 ID of a terminal device on the first wireless interface in advance, where the terminal device is covered by the two wireless network devices. Then, the second wireless network device can determine, based on the L2 ID provided by the first wireless network device, whether the L2 ID that is of the first terminal device on the first wireless interface and corresponds to the second data packet is managed by the first wireless network device. When a destination node of the second data packet includes a plurality of nodes, that is, in a case of multicast, the second wireless network device may perform matching based on a service identity (such as an MBMS session ID or a TMGI) exchanged with the first wireless network device in advance and a service identity carried in the second data packet or a service identity associated with a radio data bearer carrying the second data packet (where for example, when the radio data bearer is established, the radio data bearer is in a one-to-one correspondence with the service identity). During the matching, the second wireless network device forwards the second data packet to the first wireless network device, and then the first wireless network device performs multicast based on the service identity.

In a third protocol stack architecture, the first wireless interface bearing the first path is a direct wireless interface for direct communication between the second terminal device and the first terminal device, the second wireless interface bearing the second path is a wireless interface for communication between the wireless network device and the first terminal device, and the third wireless interface bearing the third path is a wireless interface for communication between the second terminal device and the wireless network device. Both the first terminal device and the second terminal device are managed by the wireless network device.

Figure 5:
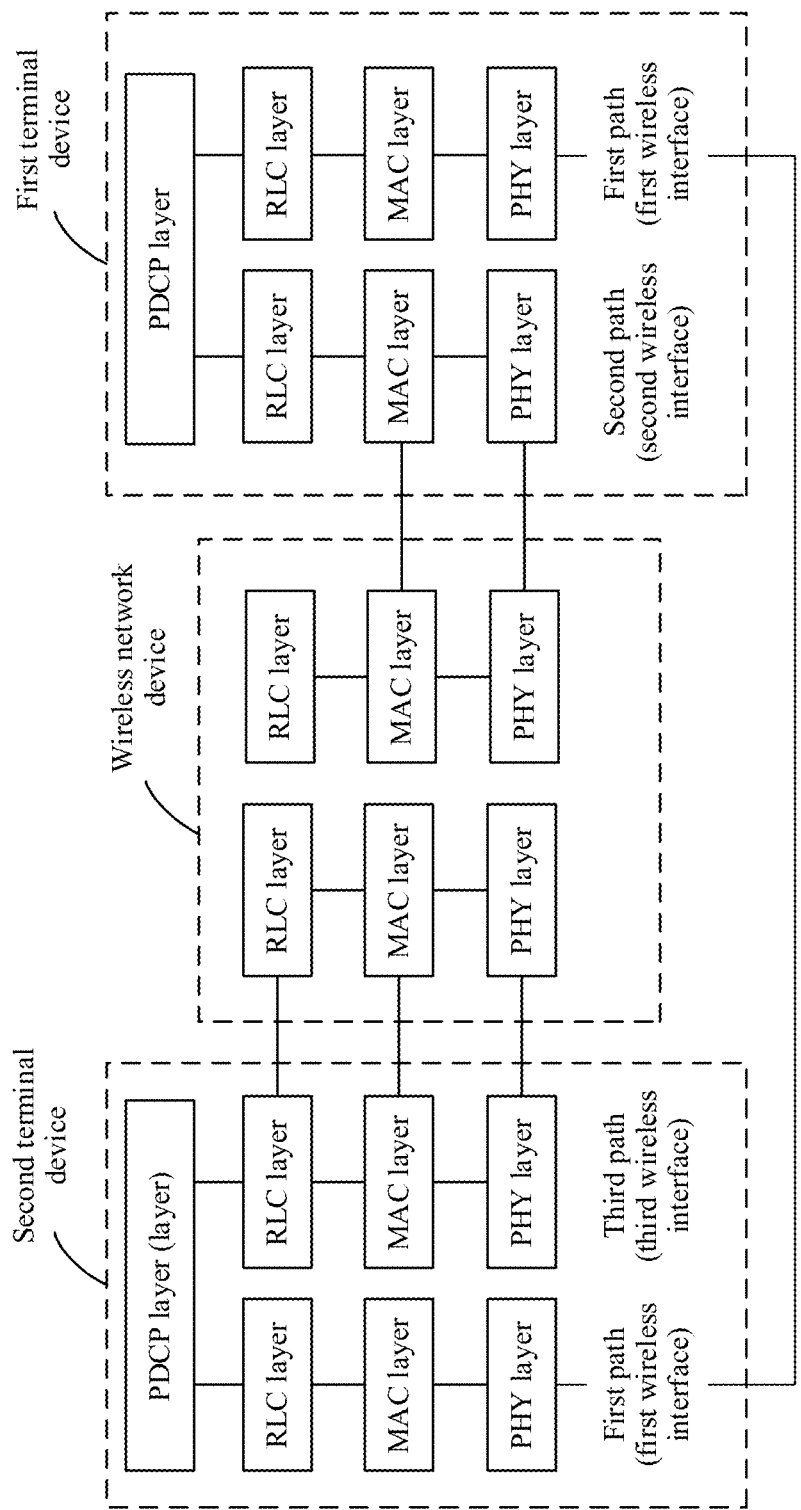
FIG. 5 is a schematic block diagram of a third protocol stack architecture according to an embodiment of this application.

FIG. 5 is a schematic architectural diagram of protocol layers in the first terminal device, the second terminal device, and the wireless network device. FIG. 5 shows only protocol layers that are in the first terminal device, the second terminal device, and the wireless network device and related to this embodiment of this application. The first terminal device, the second terminal device, and the wireless network device may further include another protocol layer. This is not specifically limited in this embodiment of this application.

No protocol layer needs to be added to the protocol stack architecture. An aggregation protocol layer (a PDCP layer) in each of the first terminal device and second terminal device. The first path and the second path in the first terminal device share a same PDCP layer, and the first path and the third path in the second terminal device share a same PDCP layer.

The protocol stack architecture shown in FIG. 5 may be applicable to the second possible manner of determining that the first path has the mapping relationship with the second path. To be specific, the first terminal device receives second configuration information sent by the wireless network device, where the second configuration information is used to indicate that the first path has the mapping relationship with the second path. The second configuration information may include the correspondence between the identification information (for example, the LTE PC5 LCID or the NR PC5 LCID) of the first path and the identification information (for example, the LTE Uu LCID/DRB ID or the NR Uu LCID/DRB ID) of the second path.

The third protocol stack architecture may be understood as an improvement to the first protocol stack architecture and the second protocol stack architecture, and the mapping relationship between the first path and the second path is notified to the first terminal device through configuration by the wireless network device instead of an adaptation layer.

Optionally, before S201, the method may further include: The first terminal device receives the second configuration information sent by the wireless network device, where the second configuration information is used to indicate that the first path has the mapping relationship with the second path.

Optionally, when the first terminal device and the second terminal device belong to a same wireless network device, the wireless network device sending the second configuration information is the wireless network device to which the first terminal device and the second terminal device belong. When the first terminal device and the second terminal device belong to different wireless network devices, the wireless network device sending the second configuration information is the first wireless network device accessed by the first terminal device.

When the first terminal device and second terminal device belong to different wireless network devices, the second wireless network device accessed by the second terminal device can send the identification information of the first path, source information, and destination information to the first wireless network device by using control plane signaling or a user plane forwarding tunnel protocol header (such as a GTP-U protocol header), so that the first wireless network device determines the receive end (the first terminal device) based on the destination information, then determines the second path having the mapping relationship with the first path, and notifies the first terminal device of the determined mapping relationship between the first path and the second path.

Optionally, the second terminal device may learn, in the possible manner 1 in the protocol stack architecture in FIG. 3, that the first path has the mapping relationship with the third path. Details are not described herein again.

In this embodiment of this application, the mapping relationship between the first path and the second path is configured by the wireless network device instead of addition of the adaptation layer to the protocol stack architecture. This helps reduce improvements on the existing protocol stack and reduce costs required for improving the protocol stack.

The protocol stack architecture shown in FIG. 5 may also be applicable to the third possible manner of determining that the first path has the mapping relationship with the second path. The aggregation identifier carried in the aggregation protocol layer of the first data packet is the same as the aggregation identifier carried in the aggregation protocol layer of the second data packet. The aggregation identifier is used to indicate a data bearer to which a data packet carrying the aggregation identifier belongs. The aggregation protocol layer is a PDCP layer.

After performing duplication processing on a to-be-sent data packet at the PDCP layer, the second terminal device obtains the first data packet and the second data packet. The PDCP layer of the first data packet includes a first aggregation identifier, and the first aggregation identifier is used to indicate a radio data bearer or PDCP entity to which the first data packet belongs; the PDCP layer of the second data packet includes a second aggregation identifier, and the second aggregation identifier is used to indicate a radio data bearer or PDCP entity to which the second data packet belongs. If the first aggregation identifier and the second aggregation identifier are the same, the first path has the mapping relationship with the second path. When the first aggregation identifier and the second aggregation identifier are the same, the first aggregation identifier and the second aggregation identifier each may be an identifier of the PDCP layer for aggregation, or may be a same radio bearer identifier (for example, a DRB ID).

The second terminal device sends the first data packet to the first terminal device through the first path, and sends the second data packet to the wireless network device through the third path. After receiving the second data packet, the wireless network device performs processing at a PHY/MAC/RLC layer, and does not perform any processing at the PDCP layer. In other words, the PDCP layer is transparent to the wireless network device. Then, based on configuration of the second path, the second data packet carrying the PDCP layer is sent to the RLC/MAC/PHY layer for processing, and then the second data packet is sent to the first terminal device through the second path.

After receiving the first data packet and the second data packet, the first terminal device determines that the first aggregation identifier carried in the PDCP layer of the first data packet is the same as the second aggregation identifier carried in the PDCP layer of the second data packet, so that the data aggregation processing is performed on the two data packets at the same PDCP layer.

Optionally, the second terminal device may learn, in the possible manner 1 in the protocol stack architecture in FIG. 3, that the first path has the mapping relationship with the third path. Details are not described herein again.

In a fourth protocol stack architecture, the first wireless interface bearing the first path is a direct wireless interface for direct communication between the second terminal device and the first terminal device, the second wireless interface bearing the second path is a wireless interface for communication between the wireless network device and the first terminal device, and the third wireless interface bearing the third path is a wireless interface for communication between the second terminal device and the wireless network device. Both the first terminal device and the second terminal device are managed by the wireless network device.

Figure 6:
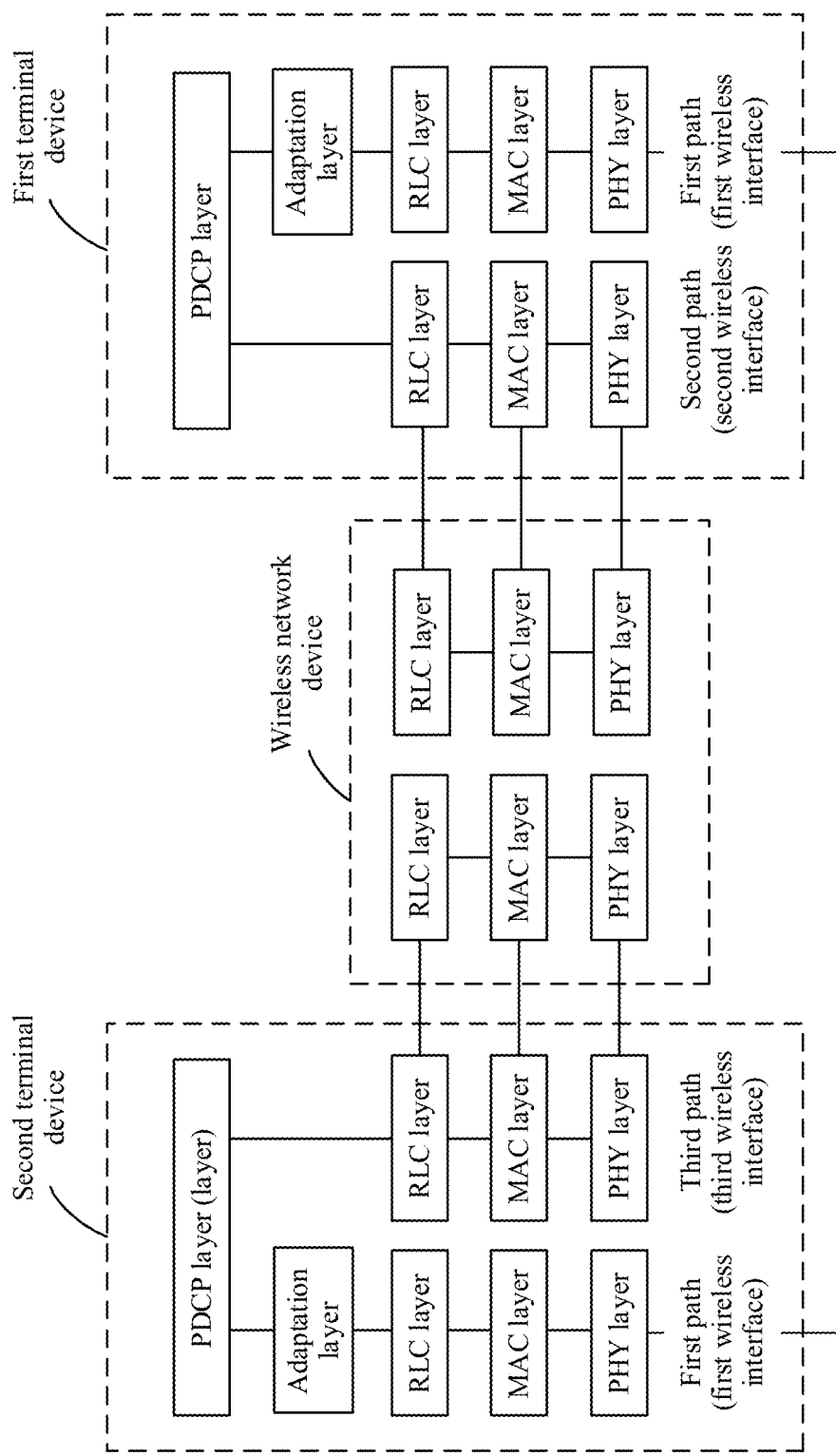
FIG. 6 is a schematic block diagram of a fourth protocol stack architecture according to an embodiment of this application.

FIG. 6 is a schematic architectural diagram of protocol layers in the first terminal device, the second terminal device, and the wireless network device. FIG. 6 shows only protocol layers that are in the first terminal device, the second terminal device, and the wireless network device and related to this embodiment of this application. The first terminal device, the second terminal device, and the wireless network device may further include another protocol layer. This is not specifically limited in this embodiment of this application.

In FIG. 6, an adaptation layer (adaption layer) is added to a protocol stack architecture corresponding to the first path that is borne on the direct wireless interface and between the first terminal device and the second terminal device. The adaptation layer may be located between a packet data convergence protocol (packet data convergence protocol, PDCP) layer and a radio link control protocol (radio link control, RLC) layer. Optionally, on the first path, for each of the first terminal device and the second terminal device, an adaptation layer is configured between a PDCP layer and an RLC layer The first path and the second path in the first terminal device share a same PDCP layer, and the first path and the third path in the second terminal device share a same PDCP layer.

The protocol stack architecture shown in FIG. 6 may be applicable to the fourth possible manner of determining that the first path has the mapping relationship with the second path. In other words, the adaptation layer of the first data packet carries the identification information of the second path.

The following describes in detail a process of transmitting the data packets through the three paths in the fourth possible manner.

After performing duplication processing on a to-be-sent data packet at the PDCP layer, the second terminal device obtains the first data packet and the second data packet.

The second terminal device adds the identification information of the second path to the first data packet at the adaptation layer of the first path. No adaptation layer is configured for the second path and the third path. Therefore, the second data packet directly reaches the RLC layer without passing through the adaptation layer. After being processed by entities at the RLC layer of the third path and a layer below the RLC layer, the second data packet is sent to the wireless network device through the third wireless interface. Then, the wireless network device sends the second data packet to the first terminal device through the second path of the second wireless interface.

Optionally, when the first terminal device and the second terminal device belong to a same wireless network device, before the second terminal device sends the first data packet, the wireless network device determines the identification information of the second path of the second wireless interface, and then sends the identification information of the second path to the second terminal device. When the first terminal device and the second terminal device belong to different wireless network devices, the wireless network device includes the first wireless network device accessed by the first terminal device and the second wireless network device accessed by the second terminal device. After determining the identification information of the second path of the second wireless interface, the first wireless network device accessed by the first terminal device sends the identification information of the second path and address information of the first terminal device to the second wireless network device accessed by the second terminal device. After receiving the identification information of the second path and the address information of the first terminal device, the second wireless network device sends, based on the address information of the first terminal device and an association relationship that is between the first terminal device and the second terminal device and retained by the second wireless network device, the identification information of the second path to the second terminal device corresponding to the first terminal device. For detailed descriptions of destination information of the first terminal device, refer to the embodiment corresponding to FIG. 3. Details are not described herein again.

Then, the second terminal device transmits the first data packet carrying the identification information of the second path to an RLC entity at the RLC layer of the first path of the second terminal device. After being processed by entities at the RLC layer of the first path and a layer below the RLC layer, the first data packet is sent to the first terminal device through the first wireless interface.

Optionally, processing processes of the first data packet and the second data packet at the RLC layer and below the RLC layer may be basically the same as a process of transmitting a data packet in the prior art, and details are not described herein.

After receiving the first data packet through the first path, the first terminal device determines that the adaptation layer of the first data packet carries the identification information of the second path, and then determines that the first path has the mapping relationship with the second path. Then, the first terminal device transmits both the first data packet received through the first path and the second data packet received through the second path to the same aggregation protocol layer entity to perform data aggregation processing, that is, performs data aggregation in a same PDCP layer entity.

Optionally, if the adaptation layer is used to notify the first terminal device that the first path has the mapping relationship with the second path, the first terminal device needs to learn of existence of the adaptation layer, so that the first terminal device can obtain the identification information of the second path from the adaptation layer of the first data packet. A manner of learning of existence of the adaptation layer includes: The wireless network device sends indication information to the first terminal device, where the indication information is used to indicate that the adaptation layer is configured for the first path of the first wireless interface of the first terminal device. For example, the wireless network device may include the indication information in an RRC message, or include the indication information in downlink control information (Downlink Control Information, DCI). Another manner of learning of existence of the adaptation layer is: When forwarding the second data packet to the first terminal device, the wireless network device includes the indication information in an RLC header or a MAC subheader of the second data packet. Still another manner of learning of existence of the adaptation layer: When sending the first path of the first wireless interface to the first terminal device, the wireless network device may configure the adaptation layer for the first path of the first terminal device.

A PDCP entity of the first terminal device performs data aggregation on the first data packet and the second data packet. When the first data packet and the second data packet are generated based on a same data packet, in other words, the first data packet is a duplicate of the second data packet, or the second data packet is a duplicate of the first data packet, the PDCP entity may discard either of the first data packet and the second data packet. If the first data packet and the second data packet are not generated based on a same data packet, in other words, sequence numbers of the first data packet and the second data packet are different, the PDCP entity of the first terminal device reorders the first data packet and the second data packet.

In the protocol stack architecture shown in this embodiment of this application, based on a function of aggregating data packets by the PDCP layer in an existing protocol stack, the first data packet received through the first path and the second data packet received through the second path are aggregated. The existing protocol stack is slightly changed. A detailed aggregation process is not described herein.

Optionally, the second terminal device may learn, in the possible manner 1 in the protocol stack architecture in FIG. 3, that the first path has the mapping relationship with the third path. Details are not described herein again.

In the communication standard R14 V2X, application layer encryption may be used between the transmit end and the receive end. Therefore, neither the PC5 interface nor the Uu interface is encrypted, or both the PC5 interface and the Uu interface are encrypted. For example, an encryption mechanism of the PC5 interface is used for both the PC5 interface and the Uu interface. Currently, whether the PDCP layer of the PC5 interface and the PDCP layer of the Uu interface need to be encrypted when the transmit end transmits a data packet to the receive end may be specified in a protocol. Alternatively, for the transmit end and the receive end, the wireless network device may configure, by using RRC messages, whether the PDCP layers of the two interfaces need to be encrypted or decrypted. For example, the PDCP layer may be a PDCP layer security switch per UE or a PDCP layer security switch per DRB, or may include a PDCP integrity protection switch (where integrity protection means integrity protection of data) and a PDCP layer encryption switch. A switch (the security switch, the integrity protection switch, or the encryption switch) may be indicated by using 0 or 1. For example, 0 indicates that the switch is not turned on, and 1 indicates that the switch is turned on, and vice versa. Alternatively, the switch may carry indication information (used to indicate that the switch is in on state) when the switch is turned on, and may not carry the indication information when the switch is not turned on.

In addition, it should be noted that when the PC5 interface is used for communication, the PDCP layer is usually not encrypted. When an LTE air interface or an NR air interface such as an LTE-Uu interface is used, an existing air interface security mechanism, namely, PDCP layer encryption, is used. In other words, when the data packet is transmitted through the PC5 interface and the Uu interface, security mechanisms of paths corresponding to the two interfaces may be different. Therefore, in this embodiment of this application, it is considered that an additional protocol layer is added above the PDCP layer. The protocol layer may be referred to as an aggregation layer (aggregation layer or convergence layer). Certainly, another name may be used. This is not specifically limited in this embodiment of this application. The following describes a protocol stack architecture in which the aggregation layer is added.

The new aggregation layer has the following functions: (1) The transmit end adds an aggregation layer protocol header, which includes a sequence number of the aggregation layer. (2) After adding the aggregation layer protocol header, the transmit end duplicates the data packet (optional function). (3) The transmit end separately send processed data packets to one or more associated PDCP entities. Particularly, if duplication processing has been performed, the transmit end separately sends data packets having a same SN number to two or more associated PDCP entities. (4) The receive end reorders received data packets. (5) The receive end performs duplicate packet detection on the received data packets. When a data packet having a specific SN number appears repeatedly, a repeated data packet is deleted, and only one data packet corresponding to the SN number is retained.

Figure 7:
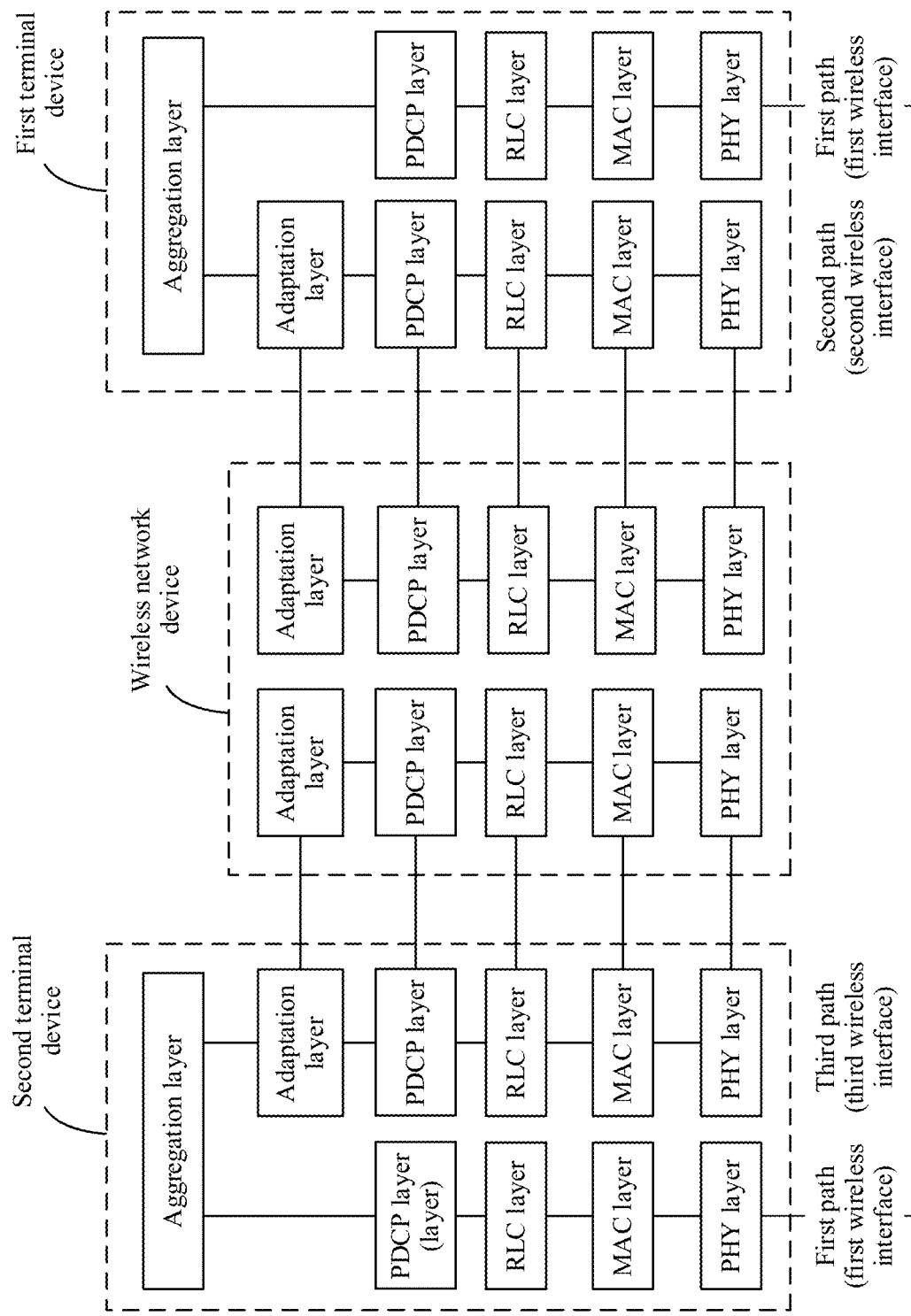
FIG. 7 is a schematic block diagram of a fifth protocol stack architecture according to an embodiment of this application.

A fifth protocol stack architecture may be understood as an improvement to the first protocol stack architecture. In the fifth protocol stack architecture, an aggregation layer for data splitting and aggregation is added to each of the first terminal device and the second terminal device. A difference between the fifth protocol stack architecture and the first protocol stack architecture is that an adaptation layer may be located above a PDCP layer. For example, as shown in FIG. 7, on the second path, for each of the first terminal device and the wireless network device, an adaptation layer is configured above the PDCP layer; and on the third path, for each of the second terminal device and the wireless network device, an adaptation layer is configured above the PDCP layer. The first path and the second path in the first terminal device share a same aggregation layer, where the aggregation layer is newly added based on an original protocol stack, and the first path and the third path in the second terminal device share a same aggregation layer. The aggregation layer is above the adaptation layer. For an LTE system, the aggregation layer is located above the PDCP layer. For an NR system, the aggregation layer is located between a service data adaptation protocol (Service Data Adaptation Protocol, SDAP) layer and the PDCP layer. In FIG. 7, the NR system is used as an example for description.

Compared with the protocol stack architecture shown in FIG. 3, not only a location of the adaptation layer is changed, but also the aggregation protocol layer responsible for splitting and aggregating data is the newly added aggregation layer instead of the PDCP layer. An aggregation layer is specific for a bearer. A packet duplication function is added at the aggregation layer of the transmit end, and data packets on which duplication is performed on or not performed on are distributed through different paths. In addition, a packet aggregation function is added at the aggregation layer of the receive end.

The following focuses on a difference from the protocol stack shown in FIG. 3, namely, a process of transmitting the second data packet through the indirect interface between the first terminal device and the first network device. For other parts, refer to descriptions of the protocol stack shown in FIG. 3. Details are not described herein again.

The fifth protocol stack architecture shown in FIG. 7 may also be applicable to the first possible manner of determining that the first path has the mapping relationship with the second path. In this case, the adaptation layer of the second data packet carries the identification information of the first path.

After performing duplication processing on a to-be-sent data packet at the aggregation layer, the second terminal device obtains the first data packet and the second data packet.

The second terminal device adds the identification information of the first path to the second data packet at the adaptation layer of the second path.

Optionally, the second terminal device may further add source information and destination information to the second data packet at the adaptation layer of the second path.

Then, the second terminal device transmits the second data packet carrying the identification information of the first path to a PDCP entity at the PDCP layer of the third path of the second terminal device. After being processed by entities at the PDCP layer of the third path and a layer below the PDCP layer, the second data packet is sent to the wireless network device through the third wireless interface.

Optionally, processing processes of the first data packet and the second data packet at the PDCP layer and below the PDCP layer may be basically the same as a process of transmitting a data packet in the prior art, and details are not described herein.

After receiving the second data packet through the third path borne on the third wireless interface, the wireless network device determines the first terminal device of the second data packet based on the destination information carried in the adaptation layer in the wireless network device, and then determines the second path for communication between the wireless network device and the first terminal device. The wireless network device sends the second data packet carrying the identification information of the first path to the first terminal device. When determining the second path for communication between the wireless network device and the first terminal device, the wireless network device determines the mapping relationship between the first path and the second path after determining the first terminal device based on the destination information, to obtain the second path for communication between the wireless network device and the first terminal device.

After receiving the second data packet through the second path, the first terminal device determines that the adaptation layer of the second data packet carries the identification information of the first path, and then determines that the first path has the mapping relationship with the second path. Then, the first terminal device transmits both the first data packet received through the first path and the second data packet received through the second path to the same aggregation protocol layer entity to perform data aggregation processing, that is, performs data aggregation in a same aggregation layer entity.

Similar to the method shown in FIG. 3, the identification information of the first path may alternatively be carried in another manner, for example, carried in a MAC subheader of the third path. The MAC subheader of the third path originally carries a logical channel identifier of the third path. By additionally adding the identification information of the first path to the MAC subheader of the third path, it is determined that the first path has the mapping relationship with the third path. After obtaining the mapping relationship between the first path and the third path, the wireless network device determines the mapping relationship between the first path and the second path. The identification information of the first path is added to a MAC subheader of the second path. The receive end determines, based on the logical channel identifier of the second path and the identification information of the first path that are carried in the MAC subheader of the second path, that the first path has the mapping relationship with the second path.

Figure 8:
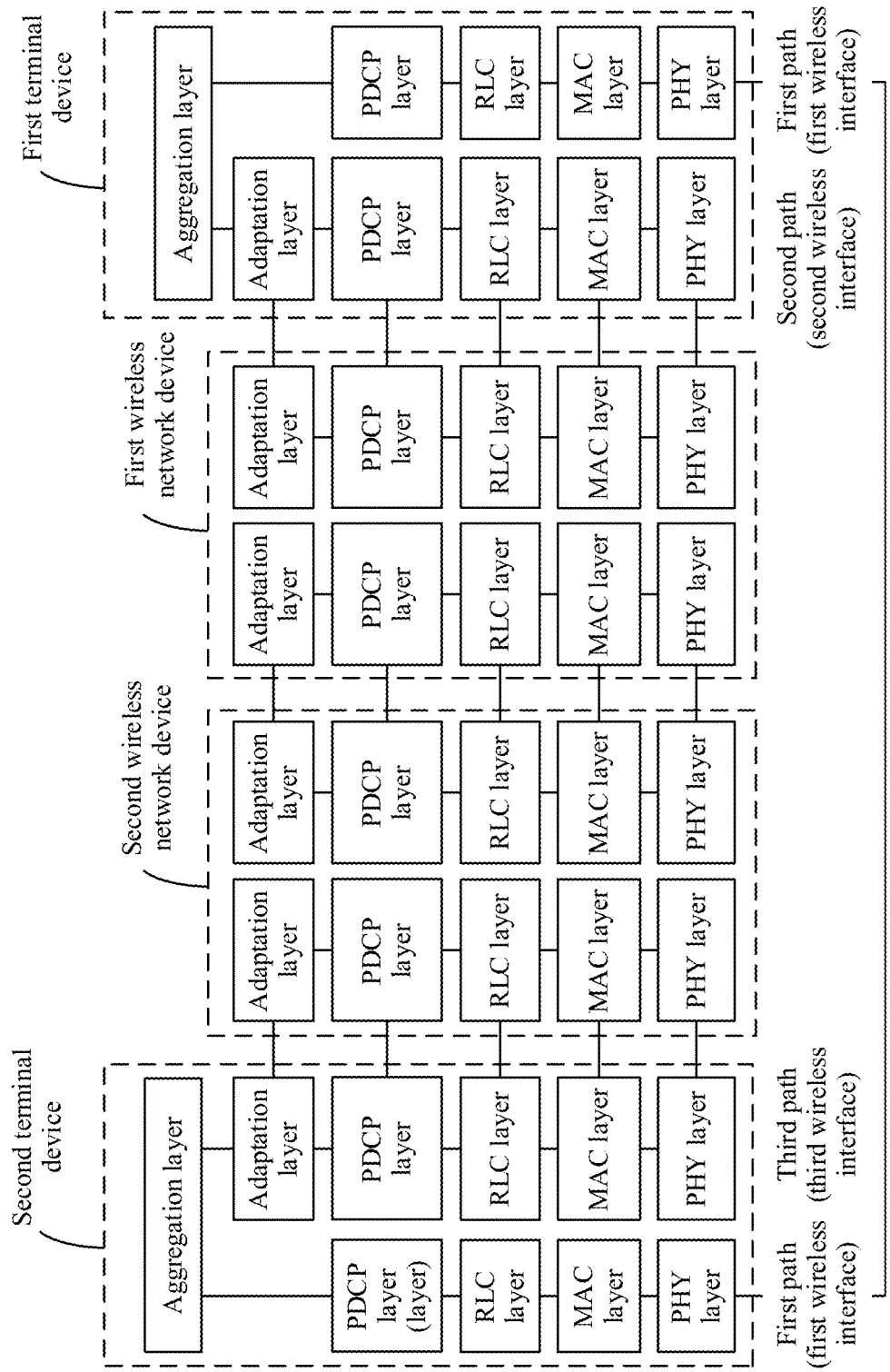
FIG. 8 is a schematic block diagram of a sixth protocol stack architecture according to an embodiment of this application.

A sixth protocol stack architecture shown in FIG. 8 is basically the same as the fifth protocol stack architecture shown in FIG. 7. For detailed descriptions, refer to the foregoing descriptions of the fifth protocol stack architecture, and a difference from the fifth protocol stack shown in FIG. 7 lies in that, in a process in which the second terminal device sends the second data packet to the first terminal device through the third path and the second path, the second data packet is forwarded by the second wireless network device and the first wireless network device. For a specific forwarding procedure, refer to the descriptions in the embodiment shown in FIG. 4, and details are not described herein again.

A seventh protocol stack architecture may be understood as an improvement to the third protocol stack architecture. In the seventh protocol stack architecture, an aggregation layer is added to each of the first terminal device and the second terminal device. The aggregation layer is above a PDCP layer. The first path and the second path in the first terminal device share a same aggregation layer, and the first path and the third path in the second terminal device share a same aggregation layer.

Figure 9:
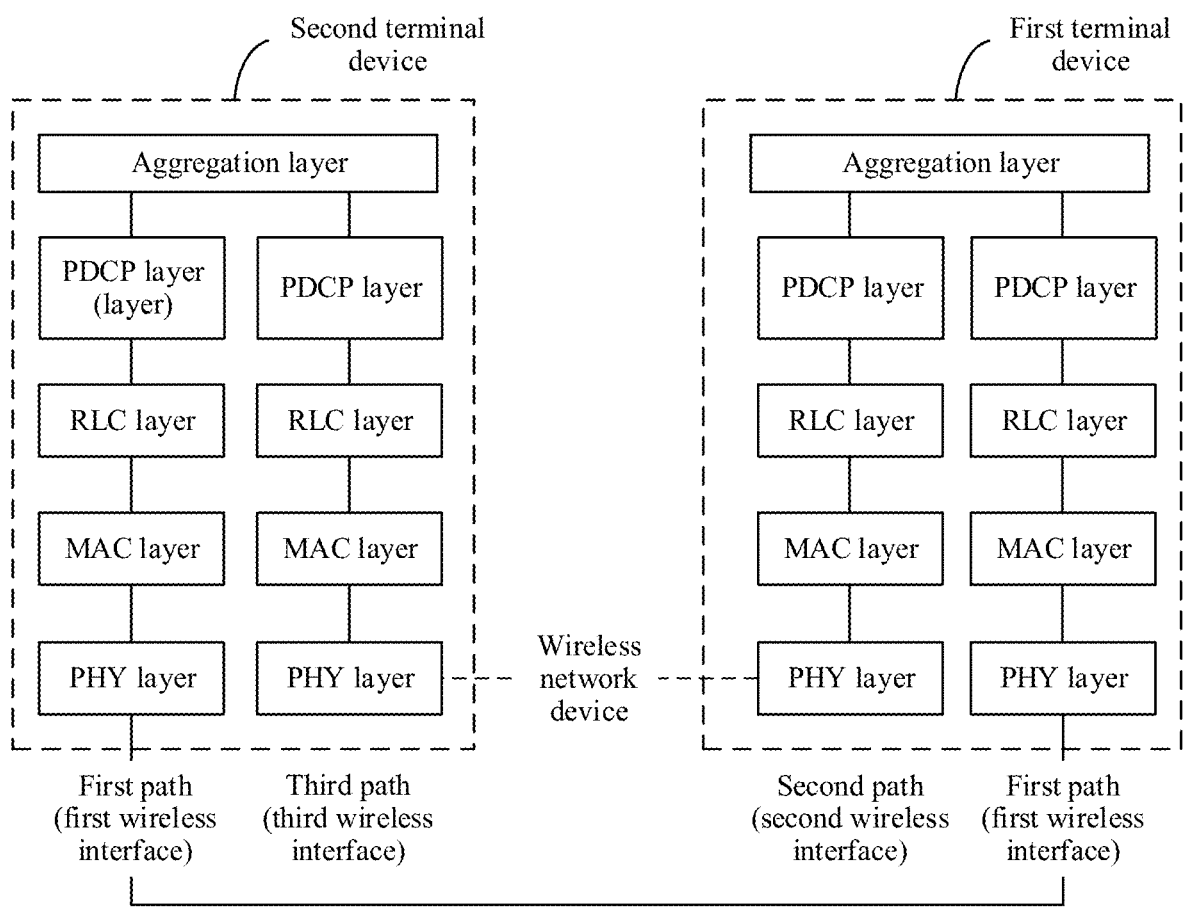
FIG. 9 is a schematic block diagram of a seventh protocol stack architecture according to an embodiment of this application.

The seventh protocol stack architecture shown in FIG. 9 may be applicable to the second possible manner of determining that the first path has the mapping relationship with the second path. To be specific, the first terminal device receives configuration information sent by the wireless network device, where the configuration information is used to indicate that the first path has the mapping relationship with the second path. The configuration information may include the correspondence between the identification information of the first path and the identification information of the second path.

It should be understood that FIG. 9 shows only protocol stack architectures of the first terminal device and the second terminal device. Because a protocol stack architecture of the wireless network device in the seventh protocol stack architecture is the same as an existing protocol stack architecture, details are not described herein again.

The only difference between the seventh protocol stack architecture shown in FIG. 9 and the third protocol stack architecture shown in FIG. 5 lies in that: The second terminal device duplicates and/or splits to-be-sent data packets at the newly added aggregation layer, and then the first terminal device performs the data aggregation processing on the first data packet and the second data packet at the newly added aggregation layer. Other processing methods are similar to the processing method in the third protocol stack architecture shown in FIG. 5, and details are not described herein again.

Figure 10A:
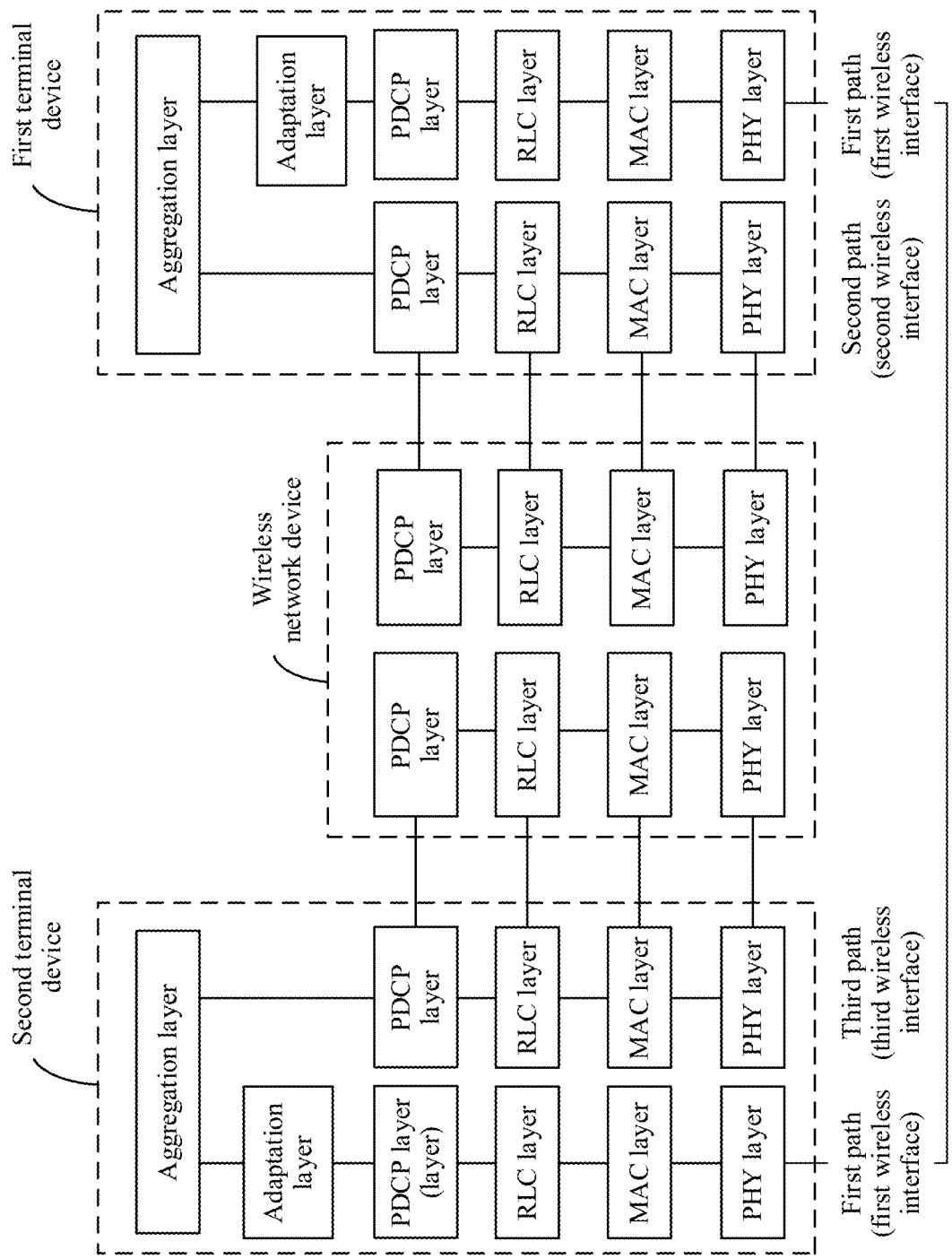
FIG. 10A is a schematic block diagram of an eighth protocol stack architecture according to an embodiment of this application.

An eighth protocol stack architecture shown in FIG. 10A may be understood as an improvement to the fourth protocol stack architecture. In the eighth protocol stack architecture, an aggregation layer is added to each of the first terminal device and the second terminal device. The aggregation layer is above a PDCP layer. The first path and the second path in the first terminal device share a same aggregation layer, and the first path and the third path in the second terminal device share a same aggregation layer.

The eighth protocol stack architecture shown in FIG. 10A may also be applicable to the fourth possible manner of determining that the first path has the mapping relationship with the second path.

The only difference between the eighth protocol stack architecture shown in FIG. 10A and the fourth protocol stack architecture shown in FIG. 6 lies in that: The second terminal device duplicates and/or splits to-be-sent data packets at the newly added aggregation layer, and then the first terminal device performs the data aggregation processing on the first data packet and the second data packet at the newly added aggregation layer. Other processing methods are similar to the processing method in the fourth protocol stack architecture shown in FIG. 6, and details are not described herein again.

In addition, it should be noted that, when the wireless network device sends the second data packet to a plurality of first terminal devices in multicast mode, an air interface may include only an RLC protocol layer/a MAC protocol layer/a PHY protocol layer, and does not need to include a PDCP layer. For example, in FIG. 7, FIG. 8, FIG. 9, or FIG. 10A, there is no PDCP protocol layer between the first terminal device and the wireless network device (or the first wireless network device).

Figure 10B:
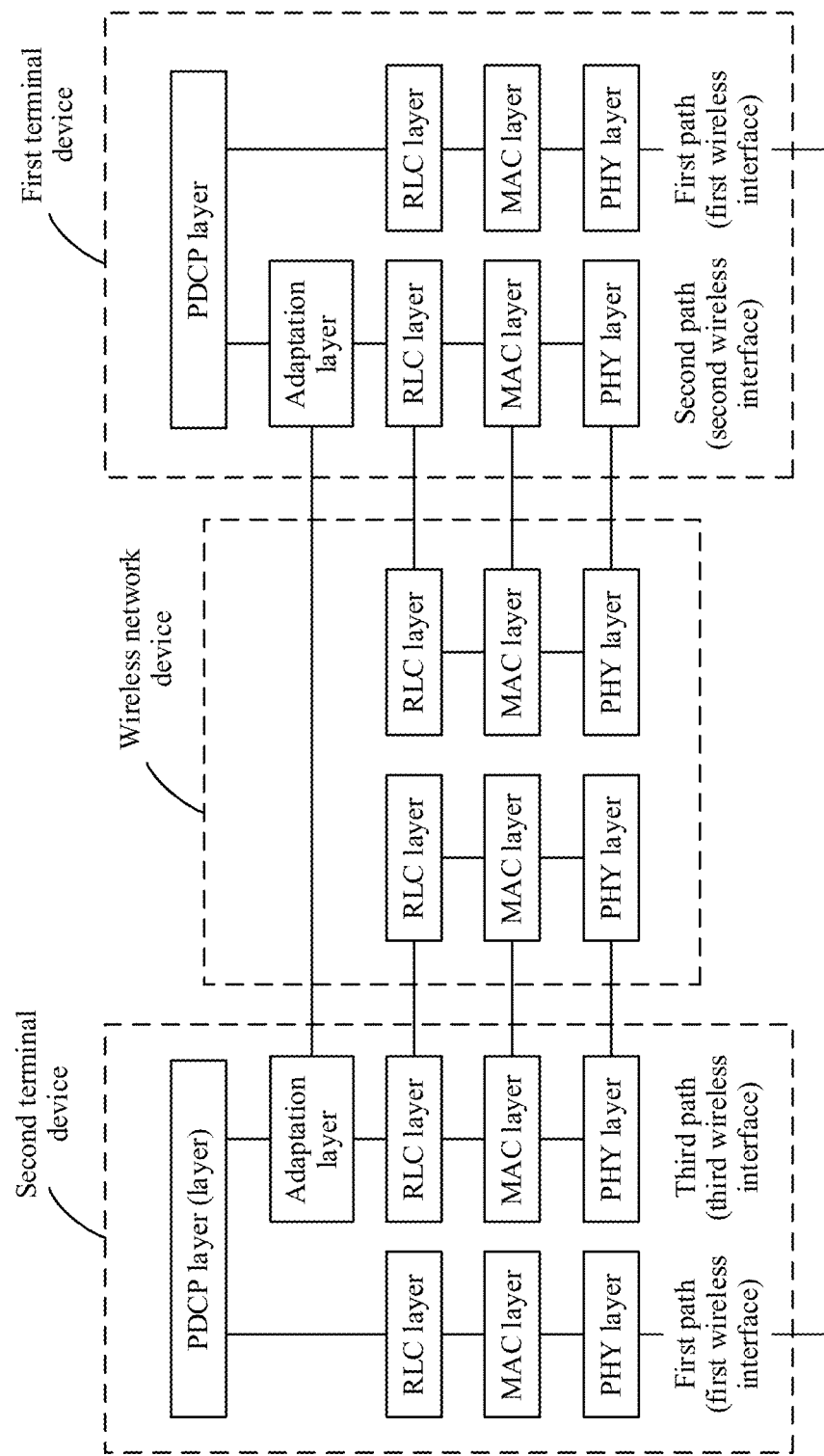
FIG. 10B is a schematic block diagram of a protocol stack architecture in which an adaptation layer is transparent to a wireless network device according to an embodiment of this application.

Particularly, when an adaptation layer is configured for each of the second path and the third path, in other words, the adaptation layer includes only the identification information of the second path, the adaptation layers added to the protocol stack may be transparent to the wireless network device. In other words, the adaptation layers exist only on the first terminal device and the second terminal device. For example, for the first protocol stack architecture shown in FIG. 3, no adaptation layer may be configured for the wireless network device. As shown in FIG. 10B, there is no adaptation layer between the second terminal device and the wireless network device, and there is no adaptation layer between the first terminal device and the wireless network device (or the first wireless network device). Similarly, for the protocol stack architecture shown in FIG. 4, FIG. 7, or FIG. 8, no adaption layer is configured. Details are not described herein again.

The first protocol stack architecture to the eighth protocol stack architecture described above based on that the first wireless interface is a direct interface, and the second wireless interface is an indirect wireless interface. In the embodiments of this application, both the first wireless interface and the second wireless interface may be direct wireless interfaces. For example, the first wireless interface is a direct wireless interface in the LTE standard, and the second wireless interface is a direct wireless interface in the NR standard.

When the first wireless interface is a direct wireless interface in the LTE standard, and the second wireless interface is a direct wireless interface in the NR standard, protocol stack architectures corresponding to paths borne on the two interfaces are the same.

Figure 11:
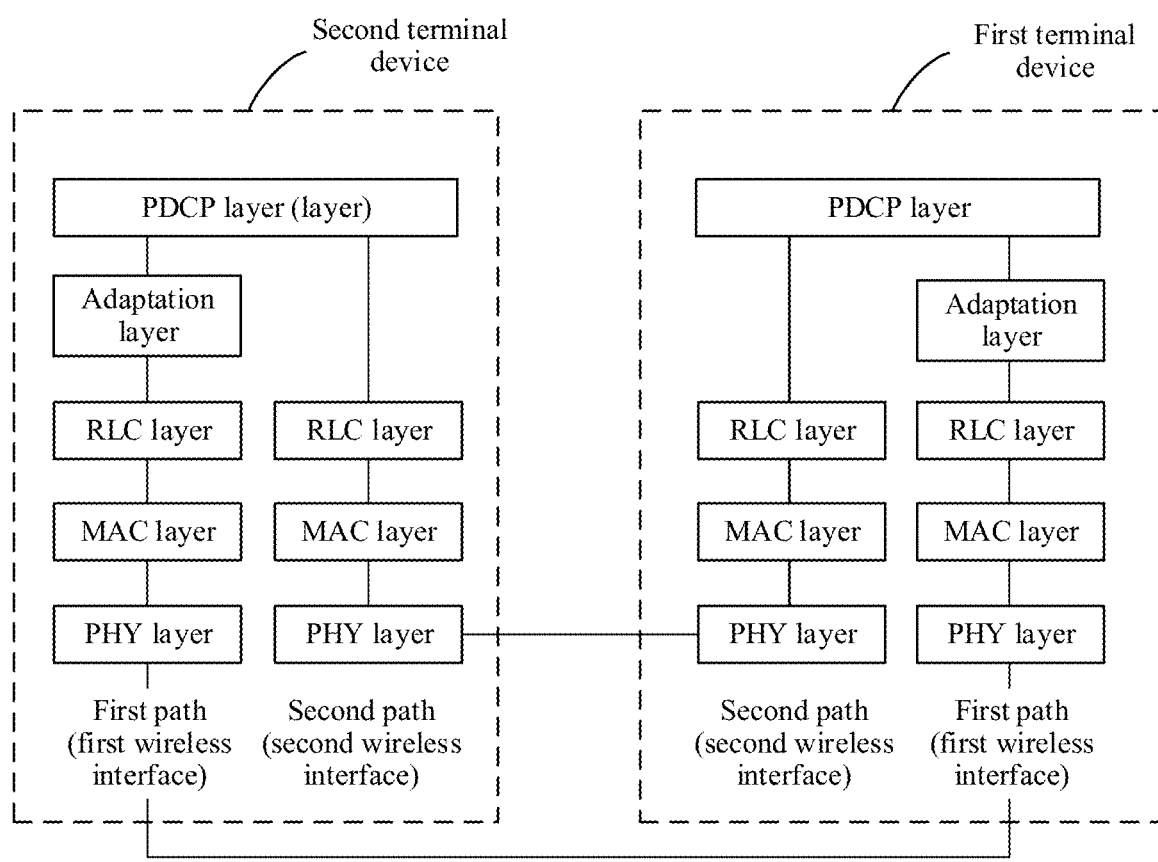
FIG. 11 is a schematic block diagram of a ninth protocol stack architecture according to an embodiment of this application.

FIG. 11 is a schematic block diagram of a ninth protocol stack architecture according to an embodiment of this application. Two wireless interfaces are both direct wireless interfaces. An adaptation layer is added to a protocol stack architecture corresponding to a path borne on one of the two wireless interfaces, and the adaptation layer is located between a PDCP layer and an RLC layer. In FIG. 11, an example in which an adaptation layer is added to a protocol stack architecture corresponding to the first path of the first wireless interface is used. In each of the first terminal device and the second terminal device, the first path and the second path share a same PDCP layer.

The protocol stack architecture shown in FIG. 11 may be applicable to the first possible manner of determining that the first path has the mapping relationship with the second path. In this case, the adaptation layer of the first data packet on the first path carries the identification information of the second path.

Certainly, if the adaptation layer is added to the second path borne on the second wireless interface, the identification information of the first path may be carried in the adaptation layer of the second data packet of the second path.

The following describes in detail a process of transmitting the data packets through the two paths.

After performing duplication processing on a to-be-sent data packet at the PDCP layer, the second terminal device obtains the first data packet and the second data packet.

The second terminal device adds the identification information of the second path to the first data packet at the adaptation layer of the first path. No adaptation layer is configured for the second path. Therefore, the second data packet directly reaches an RLC layer without passing through an adaptation layer. After being processed by entities at the RLC layer of the second path and a layer below the RLC layer, the second data packet is sent to the first terminal device through the second wireless interface.

Then, the second terminal device transmits the first data packet carrying the identification information of the second path to an RLC entity at the RLC layer of the first path of the second terminal device. After being processed by entities at the RLC layer of the first path and a layer below the RLC layer, the first data packet is sent to the first terminal device through the first wireless interface.

Optionally, processing processes of the first data packet and the second data packet at the RLC layer and below the RLC layer may be basically the same as a process of transmitting a data packet in the prior art, and details are not described herein.

After receiving the first data packet through the first path and receiving the second data packet through the second path, the first terminal device determines that the adaptation layer of the first data packet carries the identification information of the second path, and then determine that the first path has the mapping relationship with the second path. Then, the first terminal device transmits both the first data packet received through the first path and the second data packet received through the second path to the same aggregation protocol layer entity to perform data aggregation processing, that is, performs data aggregation in a same PDCP layer entity.

Optionally, if the adaptation layer is used to notify the first terminal device that the first path has the mapping relationship with the second path, the first terminal device needs to learn of existence of the adaptation layer, so that the first terminal device can obtain the identification information of the second path from the adaptation layer of the first data packet. A manner of learning of existence of the adaptation layer includes: The wireless network device sends indication information to the first terminal device, where the indication information is used to indicate that the adaptation layer is configured for the first path of the first wireless interface of the first terminal device. For example, the wireless network device may include the indication information in an RRC message, or include the indication information in downlink control information (Downlink Control Information, DCI); or the second terminal device directly includes the indication information in sidelink control information (sidelink control information, SCI) included in a physical sidelink control channel (Physical Sidelink Control Channel, PSCCH).

A PDCP entity of the first terminal device performs data aggregation on the first data packet and the second data packet. When the first data packet and the second data packet are generated based on a same data packet, in other words, the first data packet is a duplicate of the second data packet, or the second data packet is a duplicate of the first data packet, the PDCP entity may discard either of the first data packet and the second data packet. If the first data packet and the second data packet are not generated based on a same data packet, in other words, sequence numbers of the first data packet and the second data packet are different, the PDCP entity of the first terminal device reorders the first data packet and the second data packet.

In the protocol stack architecture shown in this embodiment of this application, based on a function of aggregating data packets by the PDCP layer in an existing protocol stack, the first data packet received through the first path and the second data packet received through the second path are aggregated. The existing protocol stack is slightly changed. A detailed aggregation process is not described herein.

Optionally, the second terminal device may learn, in the possible manner 1 or the possible manner 2 in the protocol stack architecture in FIG. 3, that the first path has the mapping relationship with the third path. Details are not described herein again.

Figure 12:
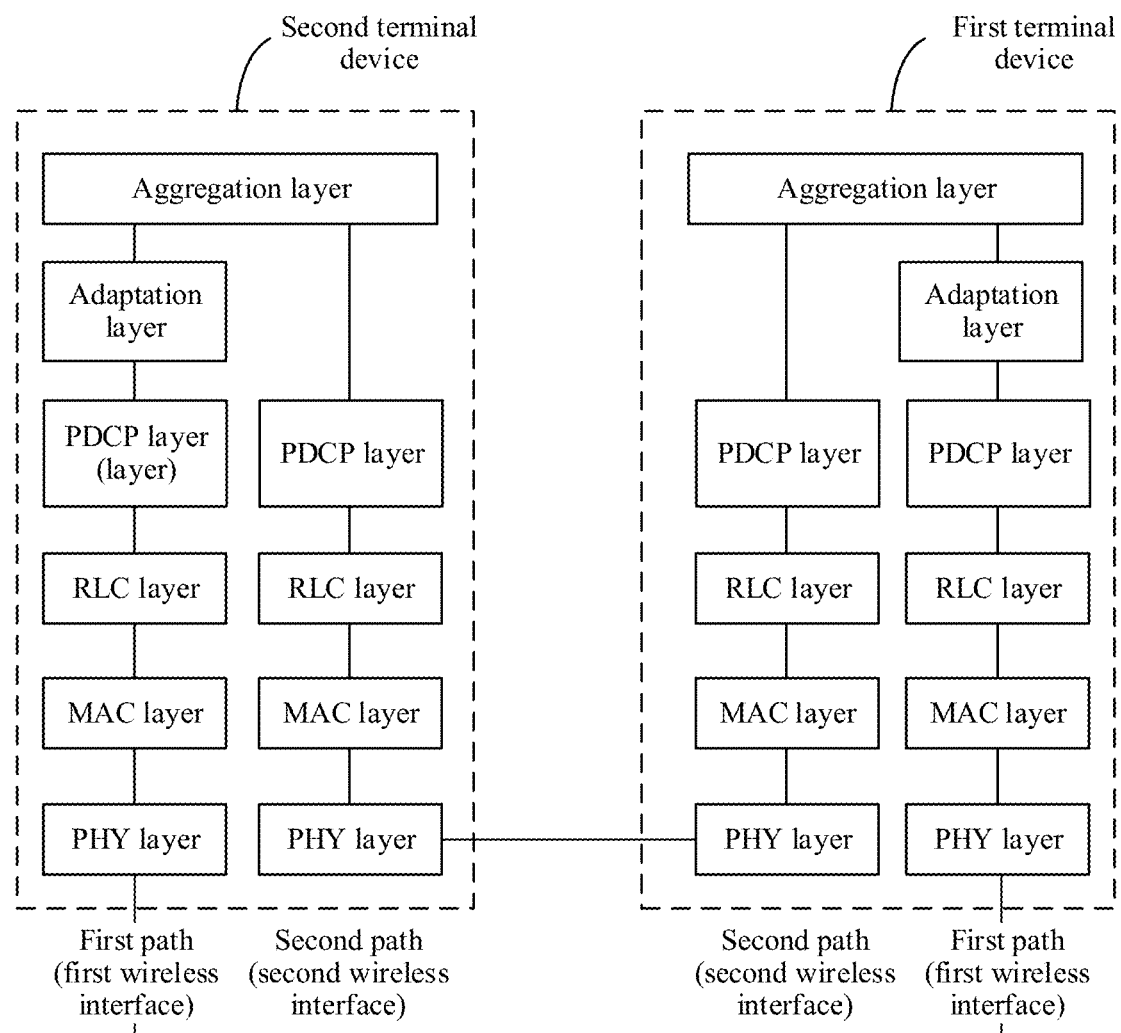
FIG. 12 is a schematic block diagram of a tenth protocol stack architecture according to an embodiment of this application.

FIG. 12 is a schematic block diagram of a tenth protocol stack architecture according to an embodiment of this application. The tenth protocol stack architecture may be understood as an improvement to the ninth protocol stack architecture. A difference between the tenth protocol stack architecture and the ninth protocol stack architecture lies in that an adaptation layer may be located above a PDCP layer. In addition, in the first terminal device and the second terminal device, the first path and the second path share a same aggregation layer, and the aggregation layer is newly added on the basis of an original protocol stack. The aggregation layer is above the adaptation layer. For an LTE system, the aggregation layer is located above the PDCP layer. For an NR system, the aggregation layer is located between an SDAP layer and the PDCP layer. In FIG. 12, the NR system is used as an example for description. Compared with the ninth protocol stack architecture, the aggregation protocol layer responsible for splitting and aggregating data is the newly added aggregation layer instead of the PDCP layer. The process of sending the data packets through the two paths is not described herein again.

Figure 13:
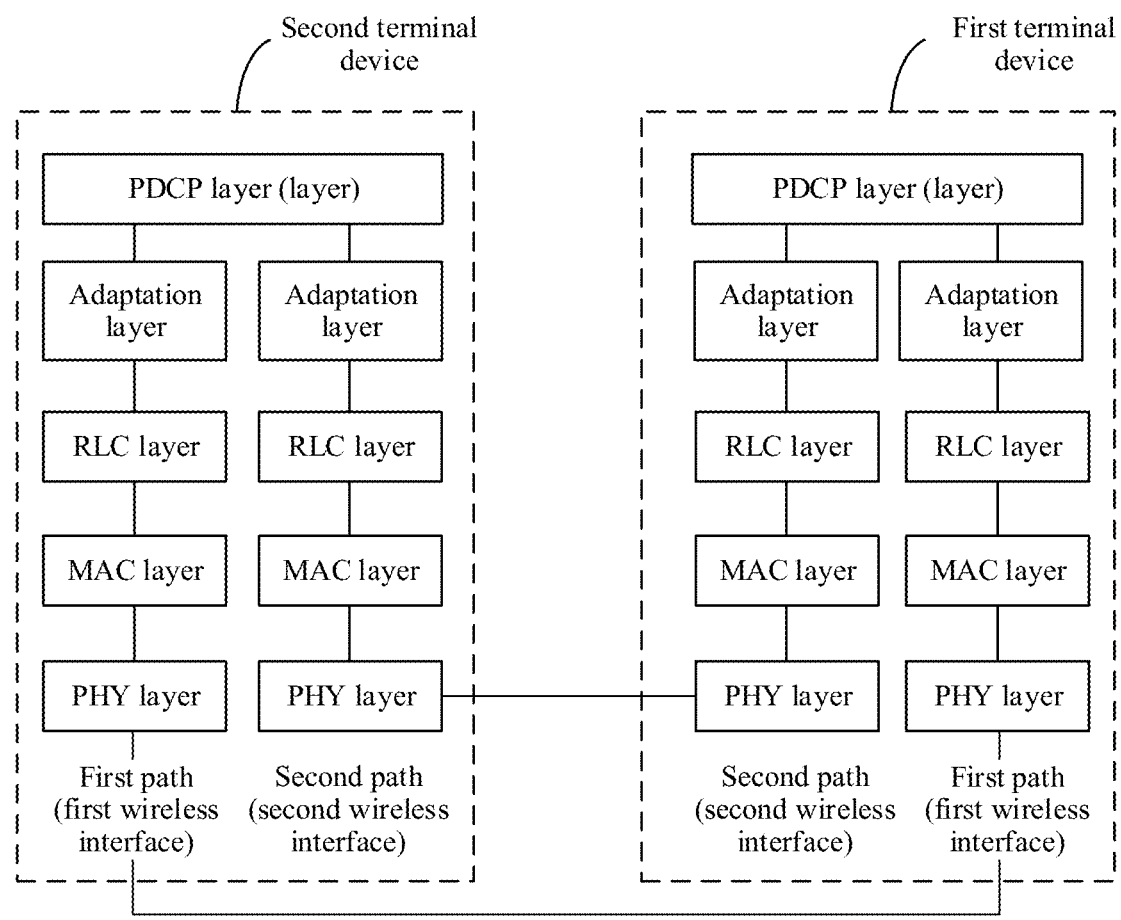
FIG. 13 is a schematic block diagram of an eleventh protocol stack architecture according to an embodiment of this application.

FIG. 13 is a schematic block diagram of an eleventh protocol stack architecture according to an embodiment of this application. In the protocol stack architecture shown in FIG. 13, an architecture of a protocol stack corresponding to the first path of the first wireless interface and an architecture of a protocol stack corresponding to the second path of the second wireless interface are the same as the architecture of the protocol stack corresponding to the first path in the ninth protocol stack architecture shown in FIG. 11. The protocol stack architecture shown in FIG. 13 may be applicable to the third possible manner of determining that the first path has the mapping relationship with the second path. In this case, an adaptation layer of the first data packet on the first path carries a first aggregation identifier, and the adaptation layer of the second data packet on the second path carries a second aggregation identifier. An aggregation identifier is used to indicate a data bearer to which a data packet carrying the aggregation identifier belongs. The aggregation protocol layer is a PDCP layer. It may be learned that, in the protocol stack architecture shown in FIG. 13, the architecture of the protocol stack corresponding to the first path of the first wireless interface and the architecture of the protocol stack corresponding to the second path of the second wireless interface are the same as the architecture of the protocol stack corresponding to the first path of the first wireless interface in the fourth protocol stack architecture. For a specific data packet transmission process, refer to the process of transmitting the data packet through the first path of the first wireless interface in the tenth protocol stack architecture. Details are not described herein again.

Figure 14:
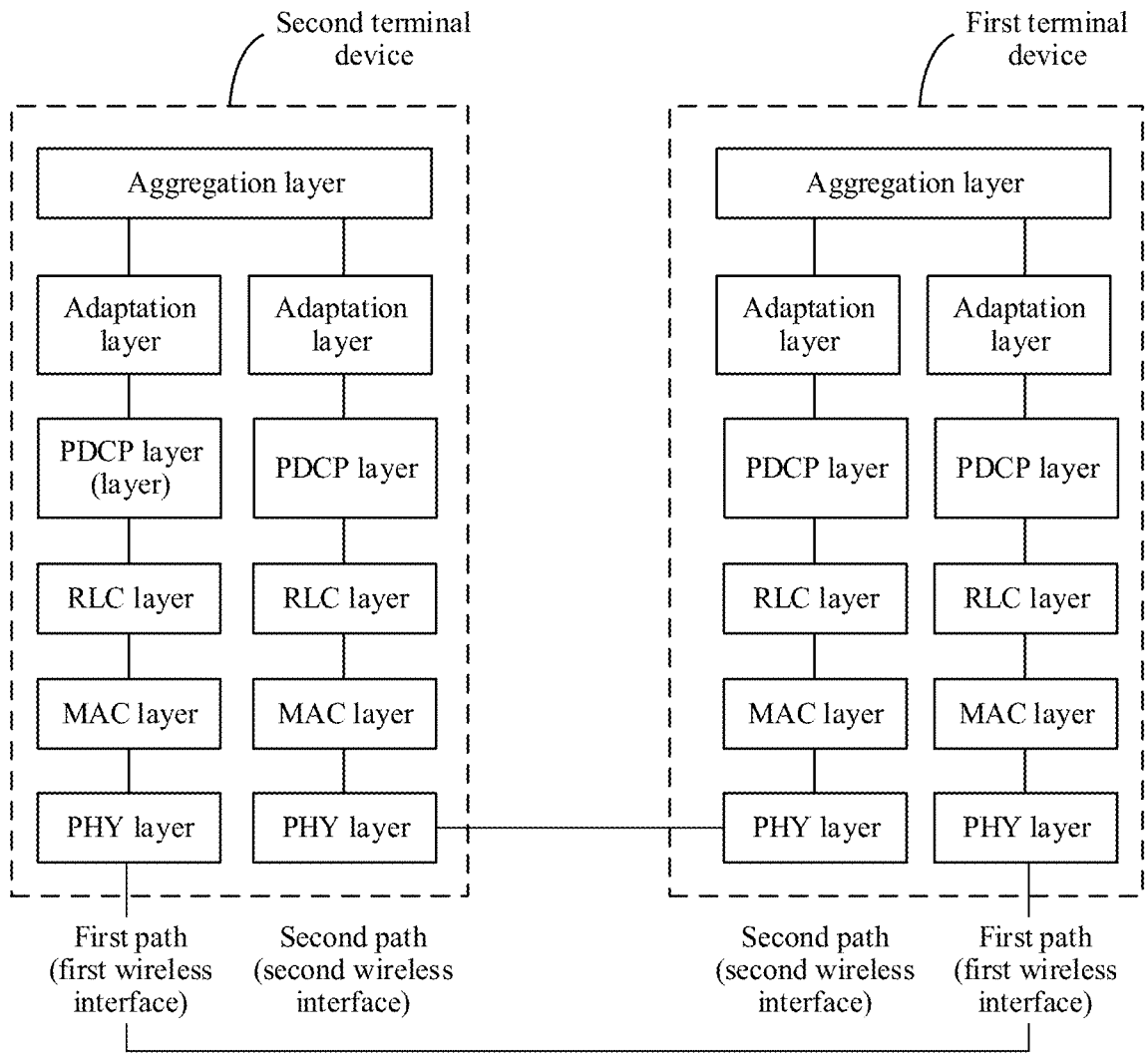
FIG. 14 is a schematic block diagram of a twelfth protocol stack architecture according to an embodiment of this application.

FIG. 14 is a schematic block diagram of a twelfth protocol stack architecture according to this application. The twelfth protocol stack architecture may be understood as an improvement to the eleventh protocol stack architecture. A difference between the twelfth protocol stack architecture and the eleventh protocol stack architecture lies in that an adaptation layer may be located above a PDCP layer. In addition, in the first terminal device and the second terminal device, the first path and the second path share a same aggregation layer, and the aggregation layer is newly added on the basis of an original protocol stack. The aggregation layer is above the adaptation layer. For an LTE system, the aggregation layer is located above the PDCP layer. For an NR system, the aggregation layer is located between an SDAP layer and the PDCP layer. In FIG. 14, the NR system is used as an example for description. Compared with the eleventh protocol stack architecture, the aggregation protocol layer responsible for splitting and aggregating data is the newly added aggregation layer instead of the PDCP layer. The process of sending the data packets through the two paths is not described herein again. It may be learned that, in the protocol stack architecture shown in FIG. 14, the architecture of the protocol stack corresponding to the first path of the first wireless interface and the architecture of the protocol stack corresponding to the second path of the second wireless interface are the same as the architecture of the protocol stack corresponding to the first path of the first wireless interface in the tenth protocol stack architecture. For a specific data packet transmission process, refer to the process of transmitting the data packet through the first path of the first wireless interface in the tenth protocol stack architecture. Details are not described herein again.

The second terminal device requires an opportunity to enable a function of sending, to the first terminal device through a plurality of paths, data packets that need to be aggregated. One method is that the wireless network device sends an indication to the second terminal device, and the second terminal device enables the function after receiving the indication. Another method is that the second terminal device determines when to enable the function.

A specific process of determining the opportunity by the wireless network device and notifying the second terminal device of the opportunity includes the following steps:

The wireless network device sends a dual connectivity indication to the second terminal device, where the dual connectivity indication is used to indicate the second terminal device to send, to the first terminal device through a plurality of paths, data packets needing to be aggregated. After receiving the dual connectivity indication, the second terminal device sends the first data packet to the first terminal device through the first path, and sends the second data packet to the first terminal device through the second path (or the third path). The mapping relationship between the first path and the second path (or between the first path and the third path) may be determined in the possible manner 1 or the possible manner 2, and details are not described herein again. In addition, when the possible manner 1 is used, the wireless network device may send first configuration information and the dual connectivity indication to the second terminal device by using a message, where the first configuration information is used to indicate that the first path has the mapping relationship with the third path; or the wireless network device may send first configuration information and the dual connectivity indication to the second terminal device by using different messages.

Certainly, the wireless network device combines the first configuration information and the dual connectivity indication into one message. In other words, the first configuration information is sent to indicate that the second terminal device can send, to the first terminal device through the plurality of paths, the data packets needing to be aggregated. An LCID of the Uu interface or an LCID of the PC5 interface corresponds to a DRB ID, an aggregation layer identifier, or a PDCP layer identifier. For example, the LCID of the Uu interface and the LCID of the PC5 interface correspond to a same DRB ID or aggregation layer identifier or PDCP layer identifier. This indicates that a path identified by the LCID of the Uu interface has a mapping relationship with a path identified by the LCID of the PC5 interface, and also indicates dual connectivity.

For example, the first configuration information includes the LCID of the Uu interface, a corresponding DRB identifier (served Radio bearer), the LCID of the PC5 interface, and a corresponding served radio bearer. If the LCID of the Uu interface and the LCID of the PC5 interface correspond to a same DRB identifier, this indicates dual connectivity, and also indicates that the LCID of the Uu interface has a mapping relationship with the LCID of the PC5 interface.

For another example, the first configuration information includes the LCID of the Uu interface and the LCID of the PC5 interface (or an LCID list of the PC5 interface), and the LCID of the Uu interface corresponds to a DRB ID, an aggregation layer identifier, or a PDCP layer identifier. This indicates dual connectivity, and also indicates that the LCID of the Uu interface has a mapping relationship with the LCID of the PC5 interface. For another example, the first configuration information includes the LCID of the Uu interface, the LCID of the PC5 interface, and a served radio bearer (DRB identifier).

Alternatively, in addition to the foregoing manners, when there is only one path of the Uu interface and one path of the PC5 interface, the wireless network device may send the dual connectivity indication only to the second terminal device, and the second terminal device determines that the path of the PC5 has a mapping relationship with the path of the Uu interface.

Similarly, when two paths are both borne on the PC5 interface, the wireless network device may also send the first configuration information and/or the dual connectivity indication in the foregoing manners, and details are not described herein again.

Optionally, the wireless network device may send the dual connectivity indication to the second terminal device by using an RRC message or in broadcast mode.

Optionally, when determining that at least one parameter reported by the second terminal device satisfies a preset rule, the wireless network device sends the dual connectivity indication to the second terminal device.

The preset rule includes but is not limited to at least one of the following (1) to (7), and may specifically include any one, two, three, four, five, six, or all of the following (1) to (7). Alternatively, the preset rule may be another rule.

(1) A ProSe per packet priority (ProSe per Packet Priority, PPPP) corresponding to a data packet currently transmitted by the second terminal device is less than a first threshold.

(2) A ProSe per packet reliability (ProSe Per-Packet Reliability, PPPR) corresponding to a data packet currently transmitted by the second terminal device is less than a second threshold.

(3) A channel busy ratio (Channel busy Ratio, CBR) of an interface that is currently used by the second terminal device is greater than a third threshold.

(4) A CBR of an interface that is not currently used by the second terminal device is less than a fourth threshold.

(5) A signal strength of an interface that is currently used by the second terminal device is less than a fifth threshold.

(6) A signal strength of an interface that is not currently used by the second terminal device is greater than a sixth threshold.

(7) A quantity of to-be-transmitted data packets that are of the second terminal device or on one path of the second terminal device is greater than a seventh threshold.

Optionally, when determining that the second terminal device does not satisfy the preset rule, the wireless network device may send an indication for disabling dual connectivity to the second terminal device. For example, when the preset rule includes one of the foregoing items and it is determined that the second terminal device does not satisfy a condition in the item, the indication for disabling dual connectivity is sent to the second terminal device. For another example, when the preset rule includes two of the foregoing items and it is determined that the second terminal device does not satisfy either of the two items, the indication for disabling dual connectivity is sent to the second terminal device; or only when it is determined that the second terminal device does not meet conditions in the two items, the indication for disabling dual connectivity is sent to the second terminal device.

A specific process of autonomously determining the opportunity by the second terminal device includes the following steps:

The wireless network device may pre-configure the rule for enabling dual connectivity for the second terminal device, so that when determining that the rule for enabling dual connectivity is satisfied, the second terminal device enables sending of data packets needing to be aggregated to the first terminal device through two paths.

Optionally, the wireless network device determines the rule for enabling dual connectivity; and the wireless network device sends the rule for enabling dual connectivity to the second terminal device. The rule for enabling dual connectivity is used to indicate the second terminal device to enable, when determining that the rule for enabling dual connectivity is satisfied, sending of data packets needing to be aggregated to the first terminal device through two paths.

The rule for enabling dual connectivity includes any one or more of the following:

a ProSe per packet priority PPPP corresponding to a data packet currently transmitted by the second terminal device is less than a first threshold;

a ProSe per packet reliability PPPR corresponding to a data packet currently transmitted by the second terminal device is less than a second threshold;

a channel busy ratio CBR of an interface that is currently used by the second terminal device is greater than a third threshold;

a channel busy ratio CBR of an interface that is not currently used by the second terminal device is less than a fourth threshold;

a signal strength of an interface that is currently used by the second terminal device is less than a fifth threshold;

a signal strength of an interface that is not currently used by the second terminal device is greater than a sixth threshold; or a quantity of to-be-transmitted data packets that are of the second terminal device or on one path of the second terminal device is greater than a seventh threshold.

Optionally, the wireless network device may further pre-configure a rule for disabling dual connectivity for the second terminal device, so that after enabling dual connectivity and determining that the rule for disabling dual connectivity is satisfied, the second terminal device disables the dual connectivity.

The rule for disabling dual connectivity may correspond to the rule for enabling dual connectivity. For example, when the rule for enabling dual connectivity includes one of the foregoing items and it is determined that the second terminal device does not satisfy a condition in the item, the indication for disabling dual connectivity is sent to the second terminal device. For another example, when the rule for enabling dual connectivity includes two of the foregoing items and it is determined that the second terminal device does not satisfy either of the two items, the indication for disabling dual connectivity is sent to the second terminal device; or only when it is determined that the second terminal device does not meet conditions in the two items, the indication for disabling dual connectivity is sent to the second terminal device.

In a possible implementation, in the possible manner 2 of determining that the first path has the mapping relationship with the third path, when the second terminal device determines, according to a rule for enabling dual connectivity, to enable dual connectivity, the second terminal device may autonomously determine a path of the PC5 interface and a path of the Uu interface, where the path of the PC5 interface is bound to the path of the Uu interface. When the two wireless interfaces are both direct interfaces, the second terminal device may further autonomously determine a path of the LTE PC5 interface and a path of the NR PC5 interface when determining to enable dual connectivity, where the path of the LTE PC5 interface is bound to the path of the NR PC5 interface. For example, it is determined that the signal strength of the currently used interface is less than the fifth threshold, and the signal strength of the unused interface is greater than the sixth threshold. Therefore, the second terminal device may determine that a path of the currently used interface has a mapping relationship with a path of the unused interface. For another example, the CBR of the interface currently used by the second terminal device is greater than the third threshold, and the CBR of the interface that is not currently used by the second terminal device is less than the fourth threshold. Therefore, the second terminal device may determine that a path of the currently used interface has a mapping relationship with a path of the unused interface. In addition, if each of the two wireless interfaces between the second terminal device and the first terminal device has only one path, it is determined that the path corresponding to one of the two wireless interfaces has a mapping relationship with the path corresponding to the other wireless interface. In this case, if the two communications interfaces between the second terminal device and the first terminal device are a direct wireless interface and an indirect wireless interface, the processing method described in the third protocol stack architecture shown in FIG. 3 may be used, the processing method described in the third protocol stack architecture shown in FIG. 5 may be used, the processing method described in the fifth protocol stack architecture shown in FIG. 7 may be used, or the processing method described in the seventh protocol stack architecture shown in FIG. 9 may be used. If the two communications interfaces between the second terminal device and the first terminal device are both direct wireless interfaces, the processing method described in the ninth protocol stack architecture shown in FIG. 11 may be used, or the processing method described in the tenth protocol stack architecture shown in FIG. 12 may be used. Details are not described herein.

In a possible implementation, when enabling sending of the data packets needing to be aggregated to the first terminal device through the plurality of paths, the second terminal device may obtain transmission resources corresponding to the plurality of paths, for example, obtain a transmission resource of a path of the PC5 interface. If the second terminal device uses a mode 3, in the mode 3, the wireless network device supports the terminal device in applying for transmission resources. In this case, the second terminal device can apply for a transmission resource from a wireless network device in the LTE standard, and apply for a transmission resource from a wireless network device in the NR standard. If the second terminal device uses a mode 4, in the mode 4, the wireless network device does not support the terminal device in applying for transmission resources. Therefore, the terminal device needs to select transmission resources. In this case, the second terminal device can select a transmission resource from a resource pool (resource pool) provided by a wireless network device in the LTE standard, and select a transmission resource from a resource pool provided by a wireless network device in the NR standard. Alternatively, the second terminal device uses the mode 3 in one standard, and uses the mode 4 in another standard. For example, the second terminal device is in the mode 3 in the LTE standard, and in the mode 4 in the NR standard. In this case, the second terminal device can apply for a transmission resource from the LTE standard, and select a transmission resource from a resource pool provided by a wireless network device in the NR standard.

Figure 15:
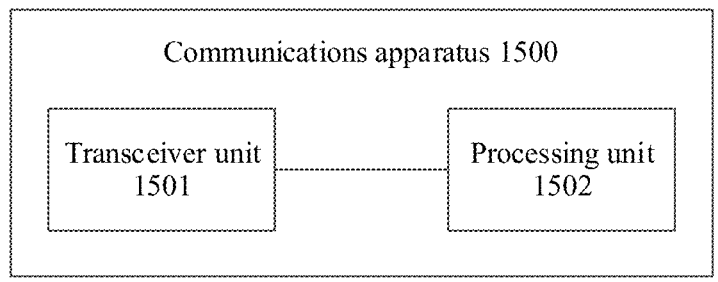
FIG. 15 is a schematic structural diagram of a communications apparatus 1500 according to an embodiment of this application.

Based on a same invention concept as that of the foregoing method embodiment, as shown in FIG. 15, this application further provides a communications apparatus 1500, which may include a transceiver unit 1501 and a processing unit 1502.

In a possible implementation, the communications apparatus 1500 may be applied to a first terminal device. The transceiver unit 1501 may be configured to: receive a first data packet and a second data packet from a second terminal device through a first path and a second path, receive configuration information from a wireless network device, or the like. The processing unit 1502 may be configured to process the first data packet and the second data packet, for example, perform data aggregation processing. Specifically, the processing unit 1502 may be configured to implement a function performed by the first terminal device in any one of the embodiments in FIG. 2 to FIG. 14.

In a possible implementation, the communications apparatus 1500 may be applied to a second terminal device. The processing unit 1502 may be configured to: generate a data packet, and add information to a corresponding layer of the data packet, and may be specifically configured to implement a function performed by the second terminal device in any one of the embodiments in FIG. 2 to FIG. 14. The transceiver unit 1501 may be configured to send a first data packet and a second data packet to a first terminal device through two different paths.

In a possible implementation, the communications apparatus 1500 may be applied to a wireless network device. The transceiver unit 1501 may be configured to receive a second data packet from a second terminal device, and the processing unit 1502 may be configured to process the second data packet. For a specific processing process, refer to a processing function performed by the wireless network device in any one of the embodiments in FIG. 2 to FIG. 14. The processing unit 1502 processes the second data packet, and then sends the second data packet to a first terminal device by using the transceiver unit 1501.

Figure 16:
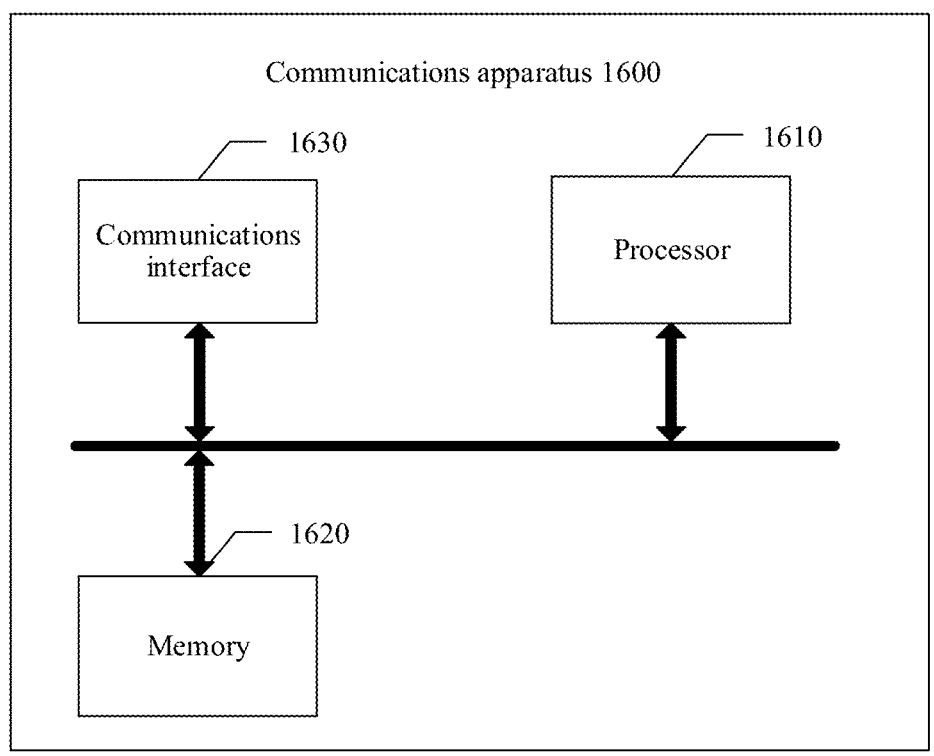
FIG. 16 is a schematic structural diagram of a communications apparatus 1600 according to an embodiment of this application.

Based on a same concept, FIG. 16 shows a communications apparatus 1600 provided in this application. The communications apparatus 1600 may be applied to a first terminal device. Specifically, the communications apparatus 1600 may be the first terminal device, or may be an apparatus that can support the first terminal device in implementing a function of the first terminal device in the methods in FIG. 2 to FIG. 14. The communications apparatus 1600 may be applied to a second terminal device. Specifically, the communications apparatus 1600 may be the second terminal device, or may be an apparatus that can support the second terminal device in implementing a function of the second terminal device in the methods in FIG. 2 to FIG. 14. The communications apparatus 1600 may be applied to a wireless network device. Specifically, the communications apparatus 1600 may be the wireless network device (or a first wireless network device or a second wireless network device), or may be an apparatus that can support the wireless network device in implementing a function of the wireless network device in the methods in FIG. 2 to FIG. 14. For example, the communications apparatus 1600 may be a chip or a chip system. Optionally, in this embodiment of this application, the chip system may include a chip, or may include a chip and another discrete component.

The communications apparatus 1600 includes at least one processor 1610 that is configured to implement a function of the first terminal device, the second terminal device, or the wireless network device in the communication method provided in the embodiments of this application. The apparatus may further include at least one memory 1620, configured to store a program instruction and/or data. The memory 1620 is coupled to the processor 1610. The coupling in this embodiment of this application is an indirect coupling or a communication connection between apparatuses, units, or modules, may be in an electrical form, a mechanical form, or another form, and is used for information exchange between the apparatuses, the units, and the modules. The processor 1610 may cooperate with the memory 1620. The processor 1610 may execute the program instruction stored in the memory 1620. Optionally, at least one of the at least one memory 1620 may be included in the processor 1610.

The communications apparatus 1600 may further include a communications interface 1630, and the communications apparatus 1600 may exchange information with another device through the communications interface 1630. The communications interface 1630 may be a circuit, a bus, a transceiver, or any other apparatus that may be configured to exchange information.

In this embodiment of this application, a specific connection medium among the communications interface 1630, the processor 1610, and the memory 1620 is not limited. In this embodiment of this application, in FIG. 16, the memory 1620, the processor 1610, and the communications interface 1630 are connected by using a bus. The bus is indicated by using a bold line in FIG. 16. A connection manner between other components is merely an example for description, and is not limited thereto. The bus may be classified into an address bus, a data bus, a control bus, and the like. For ease of representation, only one bold line is used to represent the bus in FIG. 16, but this does not mean that there is only one bus or only one type of bus.

In the embodiments of this application, a processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by a combination of hardware and software modules in the processor.

In the embodiments of this application, a memory may be a non-volatile memory such as a hard disk drive (hard disk drive, HDD) or a solid-state drive (solid-state drive, SSD), or may be a volatile memory (volatile memory) such as a random access memory (random-access memory, RAM). The memory may alternatively be any other medium that can be configured to carry or store expected program code in a form of an instruction or a data structure and that can be accessed by a computer, but is not limited thereto. The memory in the embodiments of this application may alternatively be a circuit or any other apparatus that can implement a storage function, and is configured to store the program instruction and/or the data.

Figure 17:
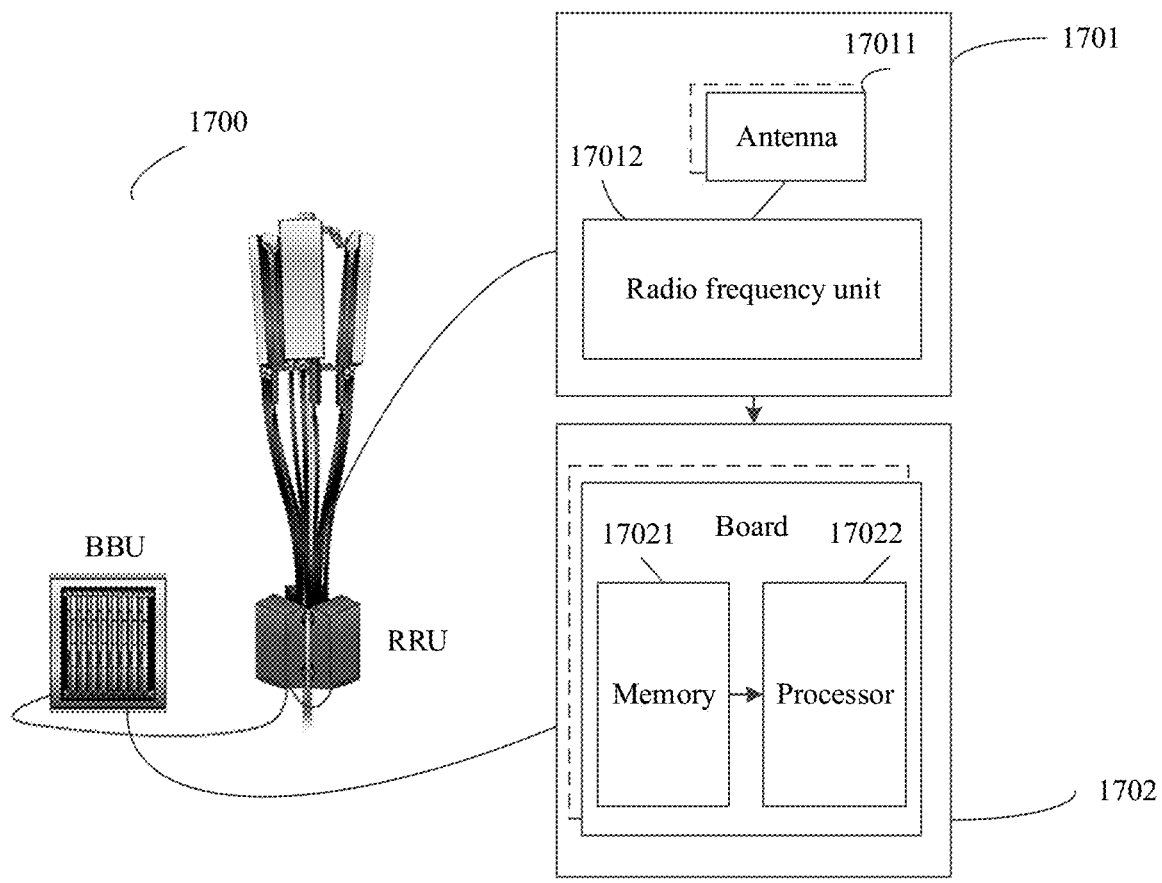
FIG. 17 is a schematic structural diagram of a wireless network device according to an embodiment of this application.

According to the foregoing method, as shown in FIG. 17, an embodiment of the present invention further provides a schematic structural diagram of a wireless network device such as a base station.

The base station may be applied to a scenario of the communications system shown in FIG. 1. The base station 1700 includes one or more radio frequency units such as a remote radio unit (remote radio unit, RRU) 1701 and one or more baseband units (baseband unit, BBU) (which may also be referred to as a digital unit (digital unit, DU)) 1702. The RRU 1701 may be referred to as a transceiver unit, a transceiver, a transceiver circuit, a transceiver machine, or the like, and may include at least one antenna 17011 and a radio frequency unit 17012. The RRU 1701 may be configured to: send and receive a radio frequency signal, and perform conversion between a radio frequency signal and a baseband signal, for example, configured to send the signaling indication and/or reference signal in the foregoing embodiments to a terminal device. The BBU 1702 may be configured to perform baseband processing, control the base station, and the like. The RRU 1701 and the BBU 1702 may be physically disposed together, or may be physically separated, namely, a distributed base station.

The BBU 1702 is a control center of the base station, or may be referred to as a processing unit, and may be configured to complete a baseband processing function such as channel coding, multiplexing, modulation, or spectrum spreading. For example, the BBU (the processing unit) may be configured to control the base station to perform the method performed by the wireless network device shown in any one of FIG. 2 to FIG. 14.

For example, the BBU 1702 may include one or more boards, and a plurality of boards may jointly support a radio access network (such as an LTE network) in a single access standard, or may separately support radio access networks in different access standards. The BBU 1702 further includes a memory 17021 and a processor 17022. The memory 17021 is configured to store a necessary instruction and necessary data. For example, the memory 17021 stores a correspondence between a transmission delay difference and information about the transmission delay difference in the foregoing embodiments. The processor 17022 is configured to control the base station to perform a necessary action. The memory 17021 and the processor 17022 may serve the one or more boards. In other words, the memory and the processor may be independently disposed on each board. Alternatively, the plurality of boards may share a same memory and a same processor. In addition, each board may further be provided with a necessary circuit.

Figure 18:
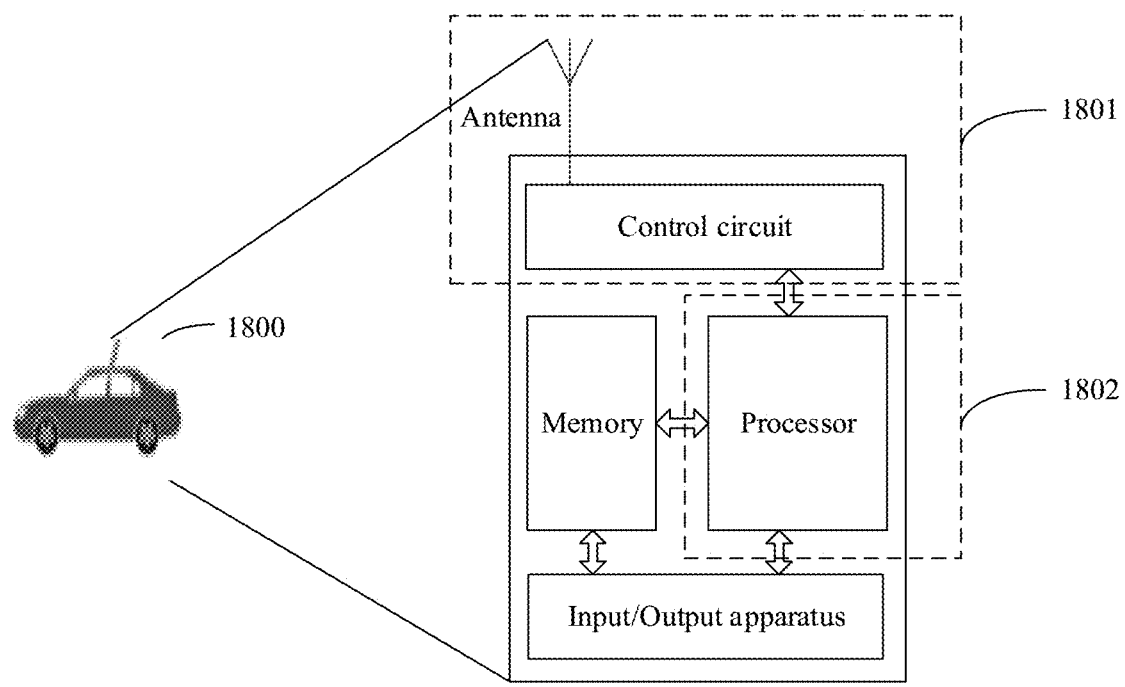
FIG. 18 is a schematic structural diagram of a terminal device according to an embodiment of this application.

FIG. 18 is a schematic structural diagram of a terminal device. In FIG. 18, a communications apparatus in a vehicle is used as an example. For ease of description, FIG. 18 shows only main components of the terminal device. The terminal device 1800 may be applied to the first terminal device or the second terminal device in any one of the foregoing embodiments of this application. As shown in FIG. 18, the terminal device 1800 includes a processor, a memory, and a control circuit. Optionally, the terminal device 1800 may further include an antenna and an input/output apparatus. The processor may be configured to: process a communication protocol and communication data, control the terminal device, execute a software program, and process data of the software program. The memory may be configured to store a software program and/or data. The control circuit may be configured to perform conversion between a baseband signal and a radio frequency signal and process the radio frequency signal. The control circuit, together with an antenna, may also be referred to as a transceiver that may be configured to send and receive a radio frequency signal in an electromagnetic wave form. The input/output apparatus, such as a touchscreen, a display, or a keyboard, may be configured to: receive data input by a user and output data to the user.

In this embodiment of this application, the processor can read a software program in a storage unit, interpret and execute an instruction of the software program, and process data of the software program. When data needs to be sent wirelessly, the processor performs baseband processing on the to-be-sent data, and then outputs a baseband signal to the radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 18 shows only one memory and one processor. Actually, the terminal device may include a plurality of processors and a plurality of memories. The memory may also be referred to as a storage medium, a storage device, or the like. This is not limited in the embodiments of the present invention.

In an optional implementation, the processor may include a baseband processor and a central processing unit. The baseband processor may be configured to process the communication protocol and the communication data, and the central processing unit may be configured to: control the entire terminal device, execute the software program, and process the data of the software program. The processor in FIG. 18 integrates functions of the baseband processor and the central processing unit. A person skilled in the art may understand that, alternatively, the baseband processor and the central processing unit may be independent processors, and interconnected by using a technology such as a bus. A person skilled in the art may understand that the terminal device may include a plurality of baseband processors to adapt to different network standards, the terminal device may include a plurality of central processing units to improve a processing capability of the terminal device, and parts of the terminal device may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

For example, in this embodiment of the present invention, the antenna having a transceiver function and the control circuit may be considered as a transceiver unit 1801 of the terminal device 1800, and the processor having a processing function may be considered as a processing unit 1802 of the terminal device 1800. As shown in FIG. 18, the terminal device 1800 may include the transceiver unit 1801 and the processing unit 1802. The transceiver unit may also be referred to as a transceiver, a transceiver machine, a transceiver apparatus, or the like. Optionally, a component configured to implement a receiving function in the transceiver unit 1801 may be considered as a receiving unit, and a component configured to implement a sending function in the transceiver unit 1801 may be considered as a sending unit. In other words, the transceiver unit 1801 includes the receiving unit and the sending unit. For example, the receiving unit may also be referred to as a receiver, a receiver machine, a receiver circuit, or the like. The sending unit may be referred to as a transmitter, a transmitter machine, a transmitter circuit, or the like.

According to the method provided in the embodiments of the present invention, an embodiment of this application further provides a communications system. The communications system includes one or more of the foregoing first terminal device, second terminal device, and wireless network device.

Based on the foregoing embodiments, an embodiment of this application further provides a computer storage medium. The storage medium stores a software program, and when the software program is read and executed by one or more processors, the method provided in any one or more of the foregoing embodiments may be implemented. The computer storage medium may include: any medium that can store program code, such as a USB flash drive, a removable hard disk, a read-only memory, a random access memory, a magnetic disk, or an optical disc.

Based on the foregoing embodiments, an embodiment of this application further provides a chip. The chip includes a processor, configured to implement a function in any one or more of the foregoing embodiments, for example, obtain or process the information or message in the foregoing methods. Optionally, the chip further includes a memory. The memory is configured to store a program instruction and data that are necessary and executed by the processor. The chip may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication apparatus, applied to a first terminal device, comprising:
   at least one processor, and a memory storing instructions executable by the at least one processor, wherein, when executed, the instructions cause the apparatus to perform operations comprising:
   receiving, through a first path, a first data packet sent by a second terminal device, wherein the first path is borne on a first wireless interface, and wherein the first wireless interface is a wireless communications interface for direct communication between the second terminal device and the apparatus;
   receiving, through a second path, a second data packet sent by the second terminal device, wherein the second path is borne on a second wireless interface, and wherein the second wireless interface is a communications interface for communication between a wireless network device and the apparatus, or wherein the second wireless interface is another wireless communications interface for direct communication between the second terminal device and the apparatus, wherein the first path has a mapping relationship with the second path; and
   transmitting, based on the mapping relationship, the first data packet and the second data packet to a same aggregation protocol layer entity to perform data aggregation processing.

2. The communication apparatus according to claim 1, wherein, when executed, the instructions cause the apparatus to perform operations comprising:
   if the second data packet received through the second path carries identification information of the first path, determining that the first path has the mapping relationship with the second path.

3. The communication apparatus according to claim 2, wherein a first adaptation layer is configured for the second path of the apparatus, and wherein the first adaptation layer is located above a packet data convergence protocol (PDCP) layer of the second path, or wherein the first adaptation layer is located between a PDCP layer of the second path and a radio link control protocol (RLC) layer of the second path; and
   the first adaptation layer of the second data packet carries the identification information of the first path.

4. The communication apparatus according to claim 3, wherein the identification information of the first path is a logical channel identifier of the first path.

5. The communication apparatus according to claim 3, wherein, when executed, the instructions cause the apparatus to perform operations comprising:
   obtaining, first indication information, wherein the first indication information is used to indicate that the first adaptation layer is configured for the second path of the apparatus.

6. The communication apparatus according to claim 1, wherein, when executed, the instructions cause the apparatus to perform operations comprising:
   receiving, configuration information sent by the wireless network device, wherein the configuration information is used to indicate that the first path has the mapping relationship with the second path.

7. The communication apparatus according to claim 6, wherein the configuration information comprises a correspondence between identification information of the first path and identification information of the second path, wherein:
   the identification information of the first path is a logical channel identifier of the first path; and
   the identification information of the second path comprises at least one of a logical channel identifier of the second path or a radio bearer identifier of the second path.

8. The communication apparatus according to claim 1, wherein, when executed, the instructions cause the apparatus to perform operations comprising:
   if the first data packet received through the first path carries identification information of the second path, determining that the first path has the mapping relationship with the second path.

9. The communication apparatus according to claim 8, wherein a second adaptation layer is configured for the first path of the apparatus, and wherein the second adaptation layer is located above a PDCP layer of the first path, or the second adaptation layer is located between a PDCP layer of the first path and an RLC layer of the first path; and
   wherein the second adaptation layer of the first data packet carries the identification information of the second path.

10. The communication apparatus according to claim 9, wherein the identification information of the second path comprises at least one of a logical channel identifier of the second path or a radio bearer identifier of the second path.

11. The communication apparatus according to claim 9, wherein, when executed, the instructions cause the apparatus to perform operations comprising:
   obtaining, second indication information, wherein the second indication information is used to indicate that the second adaptation layer is configured for the first path of the first terminal device.

12. A communication apparatus, applied to a second terminal device, comprising:
   at least one processor, and a memory storing instructions executable by the at least one processor, wherein, when executed, the instructions cause the apparatus to perform operations comprising:
      sending, a first data packet to a first terminal device through a first path; and
      sending, a second data packet to the first terminal device through a third path, wherein the second data packet carries identification information of the first path, wherein:
         the first path is borne on a first wireless interface, wherein the first wireless interface is a wireless communications interface for direct communication between the apparatus and the first terminal device;
         the third path is borne on a third wireless interface, wherein the third wireless interface is a wireless communications interface for communication between a wireless network device and the apparatus, or wherein the third wireless interface is another wireless communications interface for direct communication between the first terminal device and the apparatus; and
         the first terminal device performs aggregation processing on the first data packet and the second data packet.

13. The communication apparatus according to claim 12, wherein the identification information of the first path is a logical channel identifier of the first path.

14. The communication apparatus according to claim 12, wherein:
   an adaptation layer is configured for the third path of the apparatus;
   the adaptation layer is located above a PDCP layer of the third path, or the adaptation layer is located between a PDCP layer of the third path and an RLC layer of the third path; and
   the adaptation layer of the second data packet carries the identification information of the first path.

15. The communication apparatus according to claim 12, wherein, when executed, the instructions cause the apparatus to perform operations comprising:
   receiving, a dual connectivity indication sent by the wireless network device, wherein the dual connectivity indication is used to indicate the apparatus to send, to the first terminal device through the first and third paths, the data packets to be aggregated.

16. The communication apparatus according to claim 12, wherein, when executed, the instructions cause the apparatus to perform operations comprising:
   receiving, a rule for enabling dual connectivity sent by the wireless network device; and
   when determining that the rule for enabling dual connectivity is satisfied, enabling sending of the data packets to be aggregated to the first terminal device through the first path and the third path, wherein the rule for enabling dual connectivity comprises any one or more of the following:
      a ProSe per packet priority (PPPP) corresponding to a data packet currently transmitted by the apparatus is less than a first threshold;
      a ProSe per packet reliability (PPPR) corresponding to a data packet currently transmitted by the apparatus is less than a second threshold;
      a channel busy ratio (CBR) of an interface that is currently used by the apparatus is greater than a third threshold;
      a CBR of an interface that is not currently used by the apparatus is less than a fourth threshold;
      a signal strength of an interface that is currently used by the apparatus is less than a fifth threshold;
      a signal strength of an interface that is not currently used by the apparatus is greater than a sixth threshold; or
      a quantity of to-be-transmitted data packets that are of the apparatus or on one path of the apparatus is greater than a seventh threshold.

17. A communication apparatus, applied to a second terminal device, comprising:
   at least one processor, and a memory storing instructions executable by the at least one processor, wherein, when executed, the instructions cause the apparatus to perform operations comprising:
      receiving, configuration information sent by a wireless network device, wherein the configuration information is used to indicate that a first path has a mapping relationship with a third path, wherein:
         the first path is borne on a first wireless interface, wherein the first wireless interface is a wireless communications interface for direct communication between the apparatus and a first terminal device;
         the third path is borne on a third wireless interface, wherein the third wireless interface is a wireless communications interface for communication between the wireless network device and the apparatus, or wherein the third wireless interface is another wireless communications interface for direct communication between the apparatus and the first terminal device; and
      separately sending, to the first terminal device through the first path and the third path and based on the configuration information, data packets to be aggregated.

18. The communication apparatus according to claim 17, wherein the configuration information comprises a correspondence between identification information of the first path and identification information of the third path, and wherein:
   the identification information of the first path is a logical channel identifier of the first path; and
   the identification information of the third path comprises at least one of a logical channel identifier of the third path or a radio bearer identifier of the third path.

19. A communication apparatus, applied to a wireless network device, comprising:
   at least one processor, and a memory storing instructions executable by the at least one processor, wherein, when executed, the instructions cause the apparatus to perform operations comprising:

determining a dual connectivity indication;

sending the dual connectivity indication to a second terminal device, wherein the dual connectivity indication is used to indicate the second terminal device to send, to a first terminal device through two paths, data packets needing to be aggregated, wherein the two paths comprise a first path and a third path; and sending configuration information to the second terminal device, wherein the configuration information is used to indicate that the first path has a mapping relationship with the third path, and wherein:

the first path is borne on a first wireless interface, wherein the first wireless interface is a wireless communications interface for direct communication between the first terminal device and the second terminal device; and the third path is borne on a third wireless interface, wherein the third wireless interface is a wireless communications interface for communication between the second terminal device and the communication apparatus, or wherein the third wireless interface is another wireless communications interface for direct communication between the first terminal device and the second terminal device.

20. The communication apparatus according to claim 19, wherein, before the sending, the dual connectivity indication to the second terminal device, the instructions further cause the apparatus to perform operations comprising:

determining that at least one parameter reported by the second terminal device satisfies a preset rule.

* * * * *